May 15, 1951 C. E. LOMAX 2,552,799

PARTY LINE SELECTIVE SIGNALING SYSTEM HAVING CODE AND CONFERENCE CALL

Filed Dec. 30, 1947 12 Sheets-Sheet 1

INVENTOR.
Clarence E. Lomax
BY
Chas. L. Candy
Atty.

KEY CONFERENCE

INVENTOR.
Clarence E. Lomax
BY
Chas. W. Candy
Atty.

TWO GROUP CONFERENCE

INVENTOR.
Clarence E. Lomax
BY
Chas. [signature]
Atty.

May 15, 1951 C. E. LOMAX 2,552,799

PARTY LINE SELECTIVE SIGNALING SYSTEM HAVING CODE AND CONFERENCE CALL

Filed Dec. 30, 1947 12 Sheets-Sheet 4

MULTI GROUP CONFERENCE

*INVENTOR.*
Clarence E. Lomax

*BY* Chas. W. Canty
Atty

INVENTOR.
Clarence E. Lomax
BY
Chas. Tu. Candy
Atty.

CONNECTOR

INVENTOR.
Clarence E. Lomax
BY
[signature]
Atty.

INVENTOR.
Clarence E. Lomax
BY
Chas. Wm. Candy

CODE CALL FINDER

INVENTOR.
Clarence E Lomax
BY Chas. W. Cansby
Atty.

May 15, 1951 C. E. LOMAX 2,552,799

PARTY LINE SELECTIVE SIGNALING SYSTEM HAVING CODE AND CONFERENCE CALL

Filed Dec. 30, 1947 12 Sheets-Sheet 9

INVENTOR.
Clarence E. Lomax

BY
Chas. W. Candy
Atty.

INVENTOR.
Clarence E. Lomax
BY
Chas. Mc. Candy
Atty

*INVENTOR.*
Clarence E. Lomax
BY
Chas. Wm. Candy
Atty.

INVENTOR.
Clarence E. Lomax
BY Chas. W. Candy
Atty.

Patented May 15, 1951

2,552,799

UNITED STATES PATENT OFFICE 2,552,799

PARTY LINE SELECTIVE SIGNALING SYSTEM HAVING CODE AND CONFERENCE CALL

Clarence E. Lomax, Chicago, Ill., assignor to Automatic Electric Laboratories, Inc., Chicago, Ill., a corporation of Delaware Application December 30, 1947, Serial No. 794,601

9 Claims. (Cl. 179—18)

The present invention relates in general to automatic telephone systems, but is more particularly concerned with small systems which are commonly known as private automatic exchanges, or as a P. A. X. Exchanges of this nature are usually installed by private concerns, and in order to meet the more exacting requirements of the subscribers in these small systems, it is often necessary to provide various special features which are unnecessary in a large public exchange. The present invention is concerned with the above-mentioned special features which are commonly known as code calling, conference calling, executive "cut-in" or right-of-way and party line service.

The principal object of the invention is to provide certain new and improved circuit arrangements, whereby, the above-named special features are provided without materially increasing the cost of the equipment, while retaining simple, efficient and modern high-class telephone service.

One of the features of the invention relates to improved circuit arrangements, whereby, the rotary switch as described in the co-pending application of Kenneth W. Graybill et al., Serial No. 654,556, filed March 15, 1946, is utilized in applicants' illustrated finder, connector, code call and conference call equipment.

Another feature of the invention relates to an improved line equipment and circuit, whereby during conference calls other parties on the lines that contain a conference member are totally disconnected from their respective lines during the conference call.

Another feature of the invention relates to improved circuit arrangements, whereby, party line service, code call, conference service and executive cut-in service can all be given in the same exchange.

Still another feature relates to conference service, whereby, various types of conference service can be provided, with the requirements of the particular exchange controlling the type service to be used.

Other features, together with the ones named above, will be explained hereinafter, reference being had to the accompanying drawings which show by means of the usual circuit diagrams a sufficient amount of apparatus to enable the invention to be described and understood.

Referring now to the drawings, Figures 1 to 15, inclusive:

Figure 1 shows four lines having two substations each, such as A and A' on one line and D and D' on another, etc. Substations A', B' and C' are shown as conference members, hence, the cut-through relays such as 100, 110 and 120 are provided. Substation A' is shown as belonging to an executive and is provided with the executive cut-in non-locking push button 178. Substation A' is also provided with the non-locking push button 168 which enables the originating of the key-type conference call (push button 168 is used only when Figure 2 is a part of the exchange). The line containing substations D and D' is provided with no special features and therefore, only local or regular calls can be handled. Combined line and cut-off relays such as 130, 140, 150 and 160 are individual to each line.

Figures 2, 2A and 2B are used only when the exchange is to include conference calling, each of the Figures 2, 2A and 2B being individual to a certain type of conference service. It is to be remembered that only one type conference can be used at a time, therefore, only one of the Figures 2, 2A or 2B can be used at a time. It will be noted that each of the figures have been drawn so as to be easily substituted for the other and to readily connect between Figure 1 and the adjoining figures. It will also be noted that the ring cut-off and battery feed relays individual to each line that is provided with conference service, are given the same number and location in each of the figures and that the functions of the above mentioned relays are identical in each figure. However, the relays in the respective right-half portions of each figure are different. In Figure 2 a single conference group is provided, substations A', B', and C' being the conference members, with one of the substations such as A' having a key for initiating the conference call. In Figure 2A two-conference group service is shown with substations A' and C' being individual to groups 1 and 2 respectively and substation B' being common to both groups. In Figure 2B multi-group conference service is shown, with only two groups illustrated. Substations A' and C' are again in different groups and substation B' is common to both.

Figure 6:
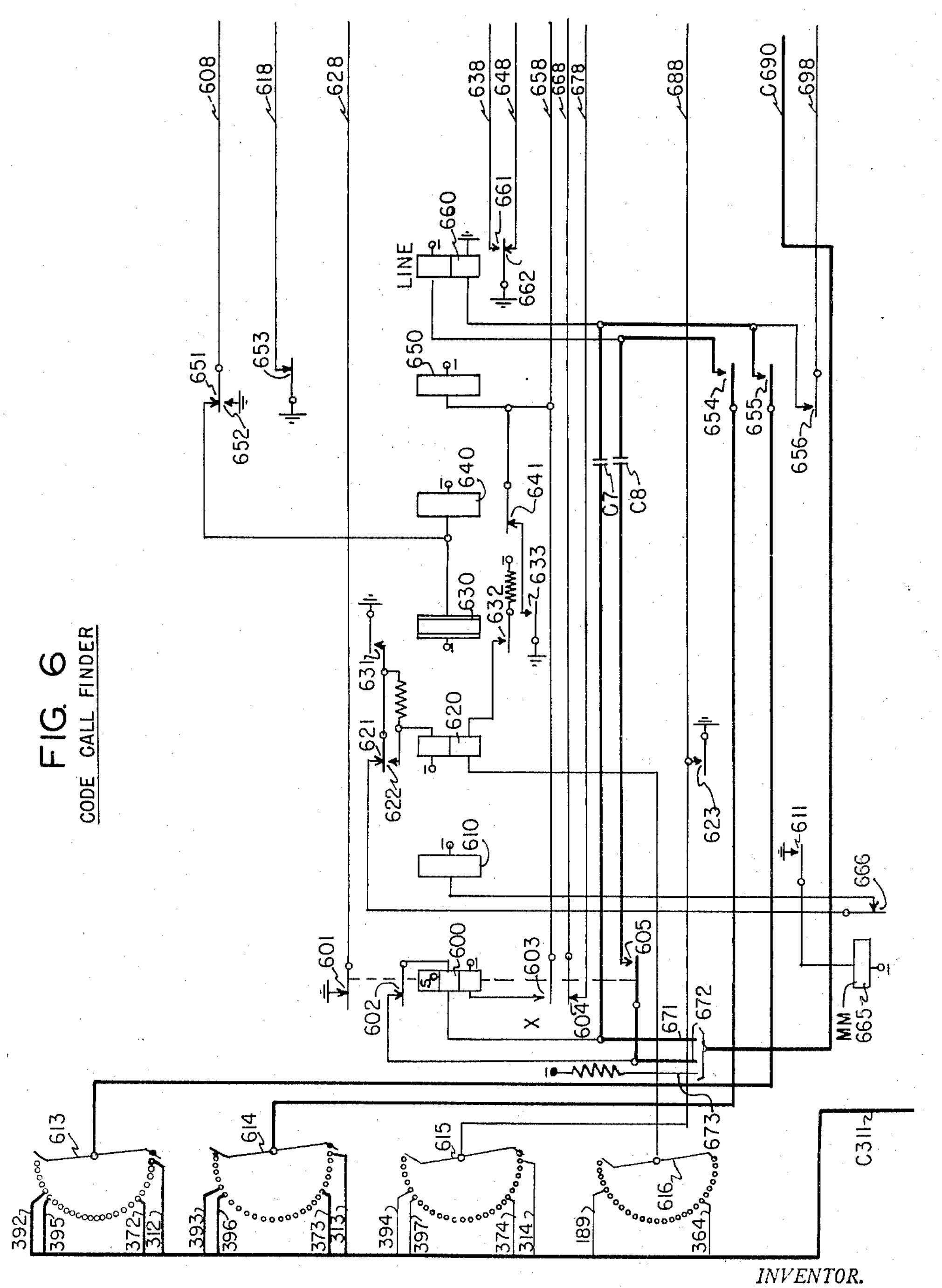
Figure 7:
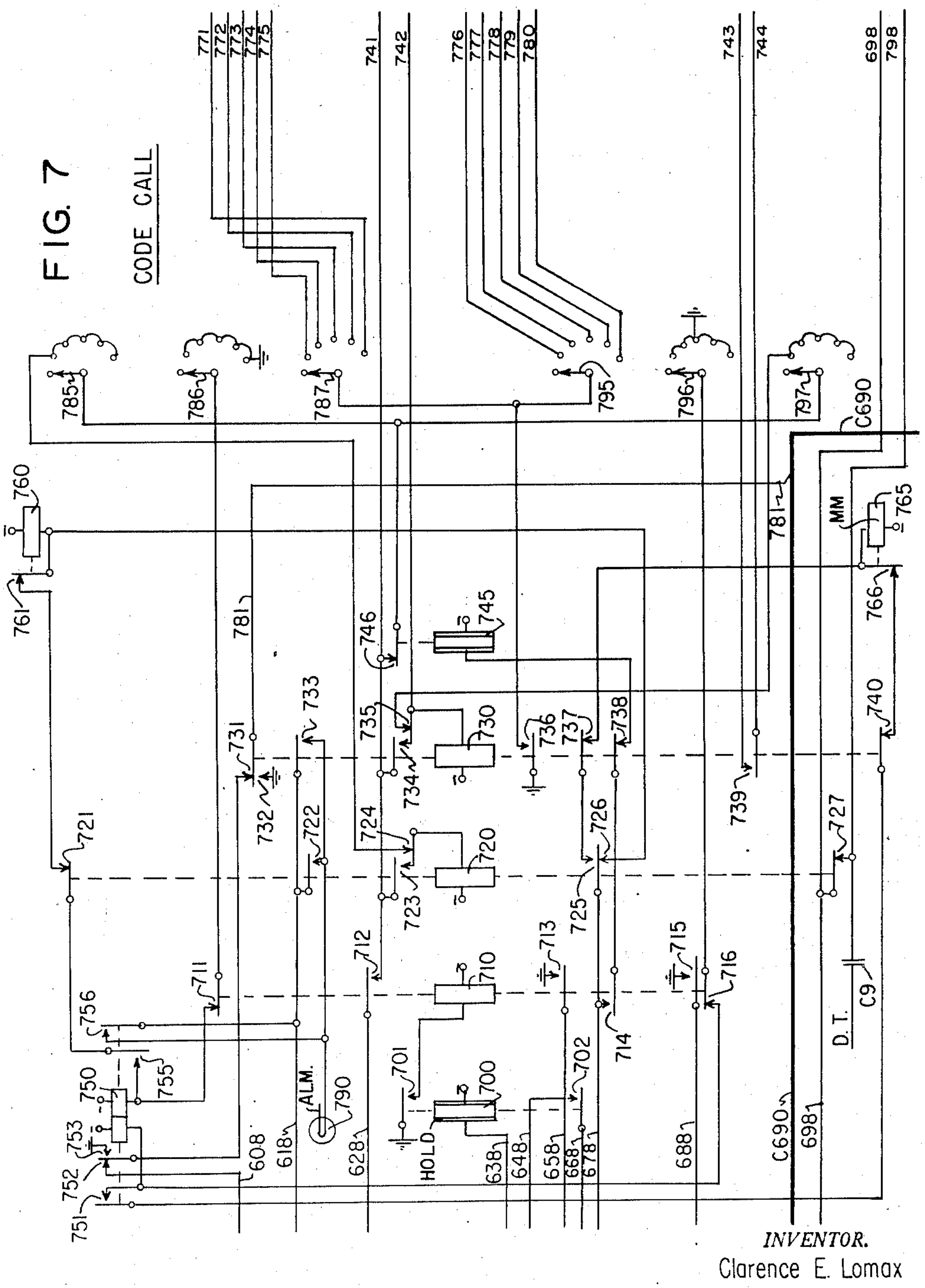
Figure 8:
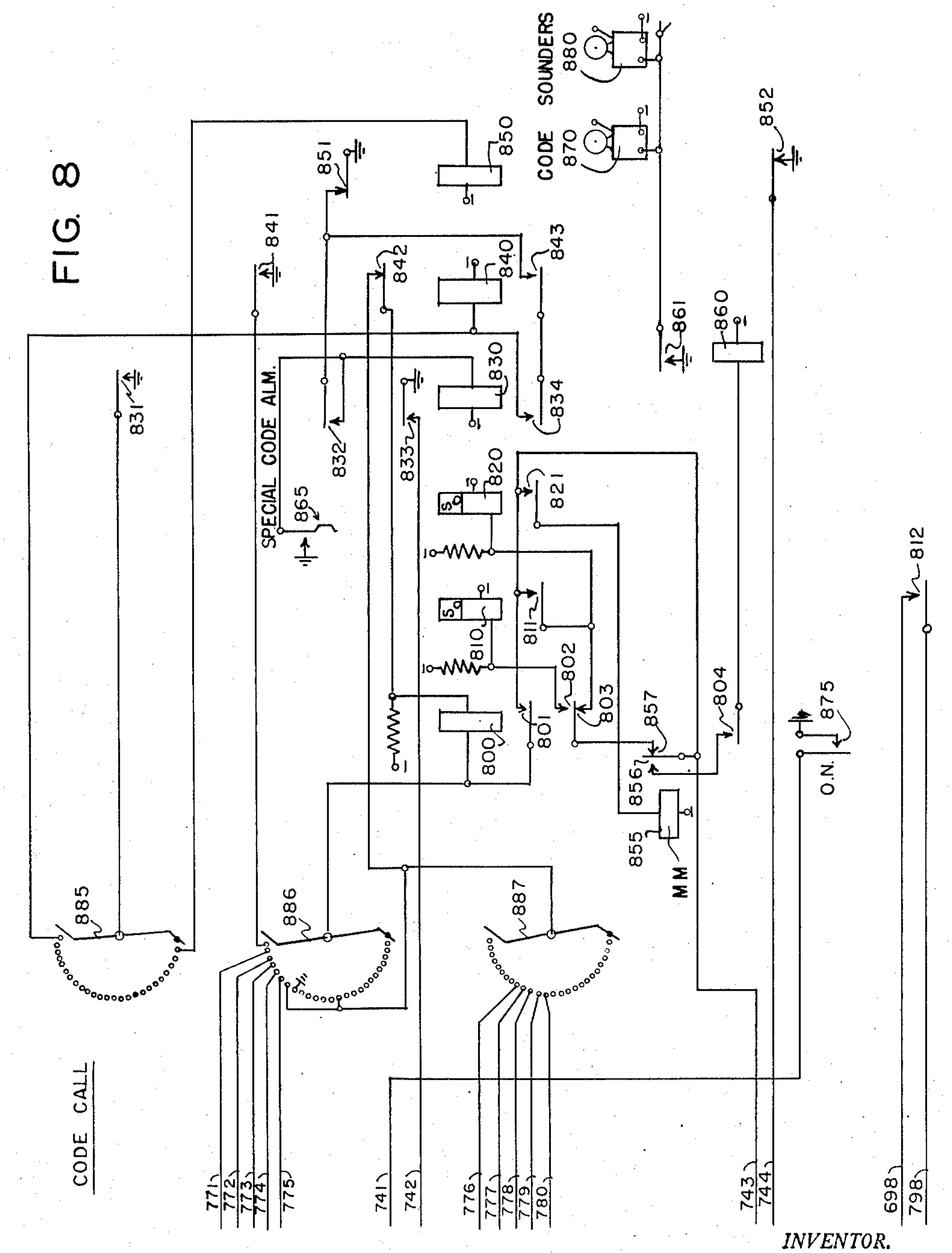

Figures 6, 7, and 8 show the code call equipment, with Figure 6 showing the code call finder, Figure 7 showing the pulsing circuit and code selecting equipment and Figure 8 showing the code sounding equipment.

Figure 9:
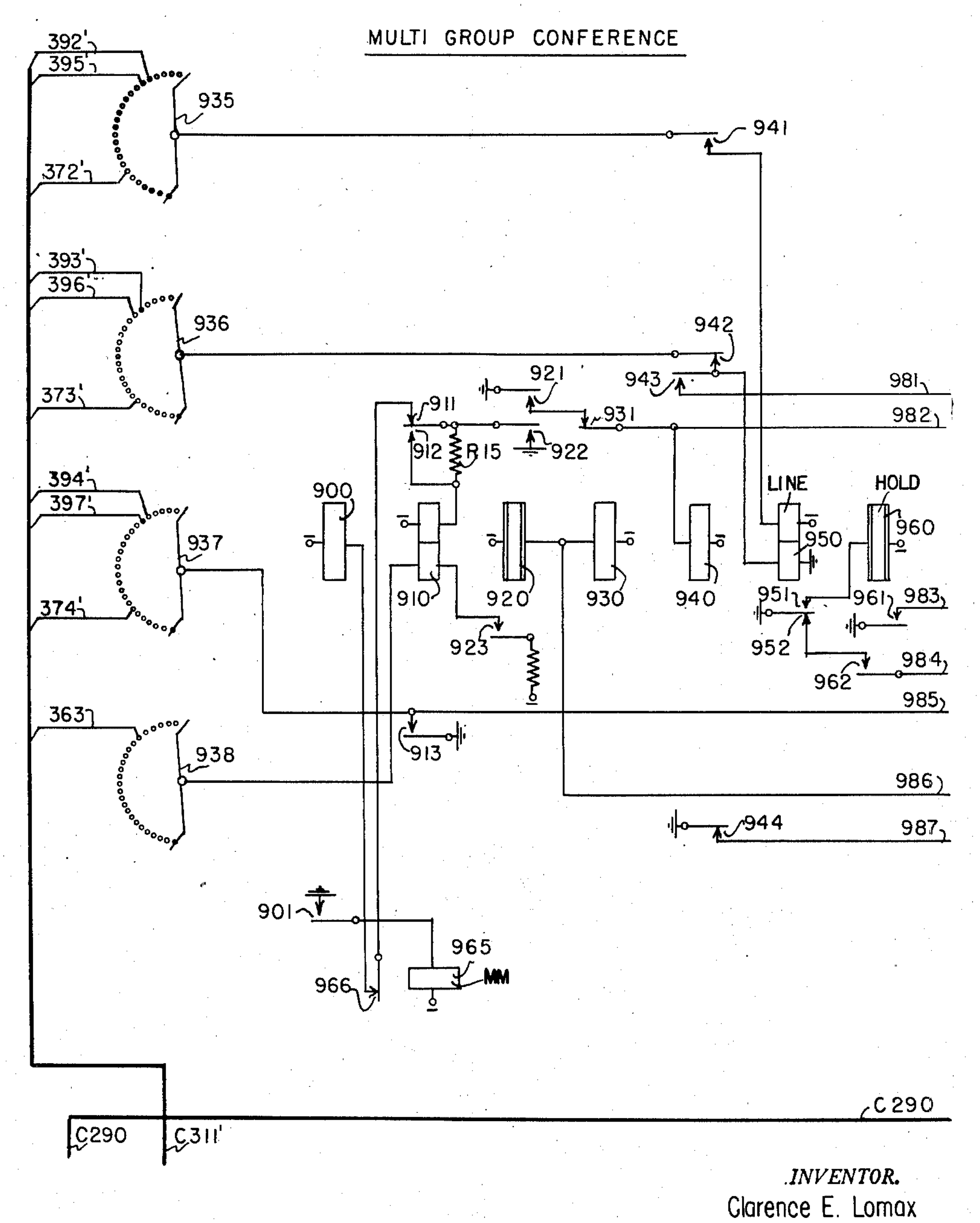
Figure 10:
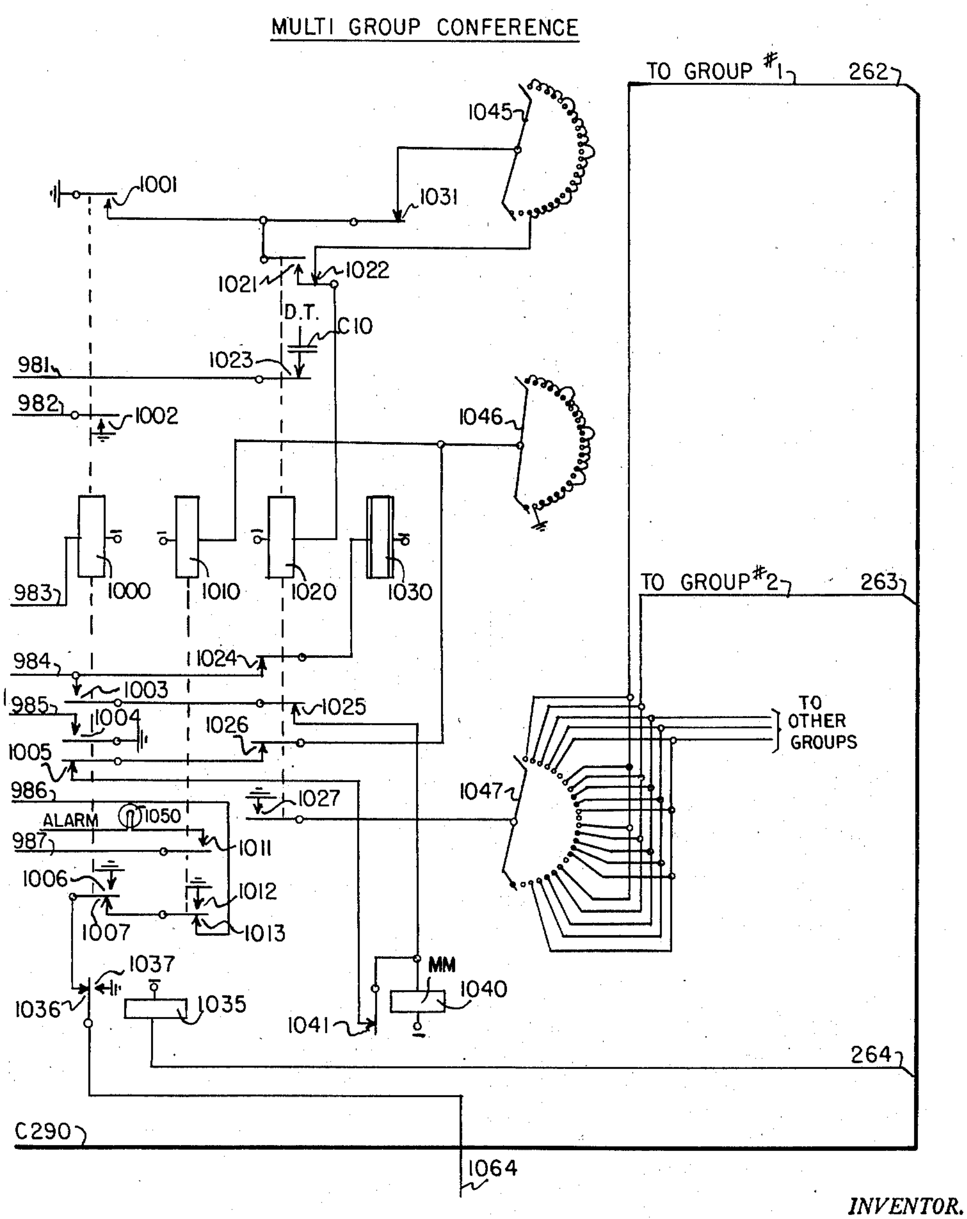

Figures 9 and 10 show the multi-group conference equipment, with Figure 9 showing the group conference finder and Figure 10 shows the group selecting equipment.

Figures 11, 12, 13, 14 and 15 are figure-number diagrams and show the drawing arrangements for the descriptions of the sections entitled Regular P. A. X service, Key conference, Code call, Two group conference and Multi-group conference, respectively.

Having briefly described the apparatus involved in each figure, a more detailed description of the various operations will follow:

It is to be remembered that the maximum number of lines served by an exchange of this type is 20 lines, and the number of finder connector links may be limited to not more than four. Four lines have been shown, with two parties each and so arranged as to be rung on the opposite sides of the lines. The equipment at each sub-station consists of the well-known, dial, receiver, transmitter and ringer, therefore only the ringer connections at each substation have been shown, likewise the illustrated substations' call numbers. All regular call numbers are two-digit numbers and assuming that a full capacity of 20 lines are in use and also assuming each line has two parties the call numbers will be arranged in the following order: the digits 31 to 30 and 41 to 40 will be used for the first group of ten lines and the digits 51 to 50 and 61 to 60 will be used for the second group of ten lines. The digits 31 to 30 and 51 to 50 will cause the ringing to be applied to the positive line conductors and the digits 41 to 40 and 61 to 60 will cause ringing to be applied to the negative line conductors.

A rotary switch having 26 positions with 25 bank contacts has been utilized wherever applicable in the exchange. The 26th position is the normal "home" position for the wipers, while the first and second contacts of the connector rotary switch may be used for either code call or two-group conference service, the third and fourth contacts of the same switch utilized for the first digit of the call number when dialing the first group of ten lines and the 15th contact is used as a stopping point for the first digit of the call number when dialing the second group of ten lines. Thus, it will be seen that the first group of ten lines uses contacts 5 through 14 and the second, or last, group of ten lines uses contacts 16 through 25. The rotary switch of the finders (including the code call finder and conference call finder and group selector) are of the non-numerical type and therefore do not use the 26th or "home" position, whereas, the rotary switch of the connector and code ringing selector are numerical and do use their "home" positions.

Figure 1:
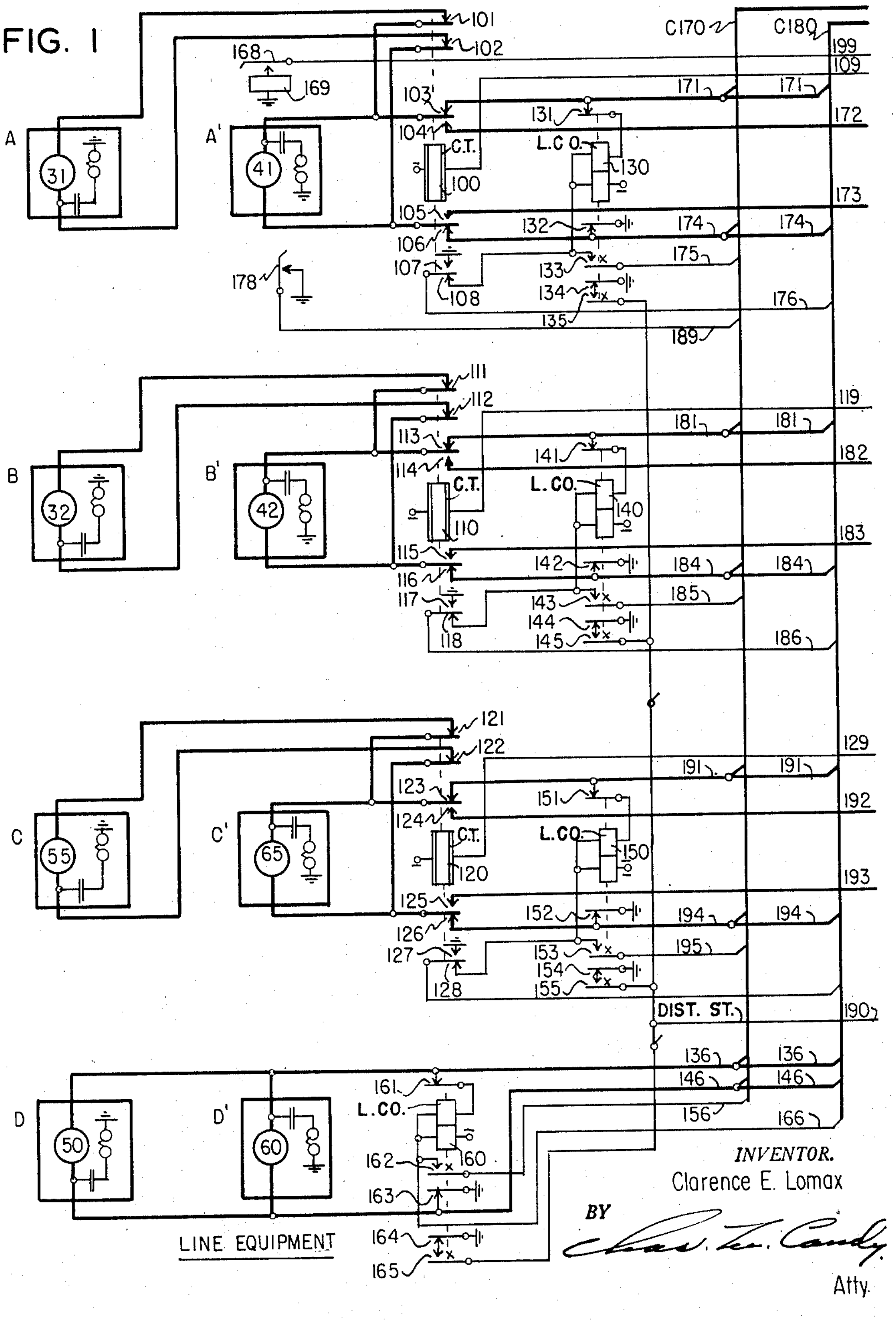

Referring to Figure 1 for the present, the combined line and cut-off relays such as 130, 140, 150 and 160 are actually a two-step relay having two separate and distinct operations, the first operation closing only the "*x*" marked contacts and the second operation actuating the remaining contacts. The first operation compares with that of a line relay and the second operation compares with the action of a cut-off relay.

Figure 5:
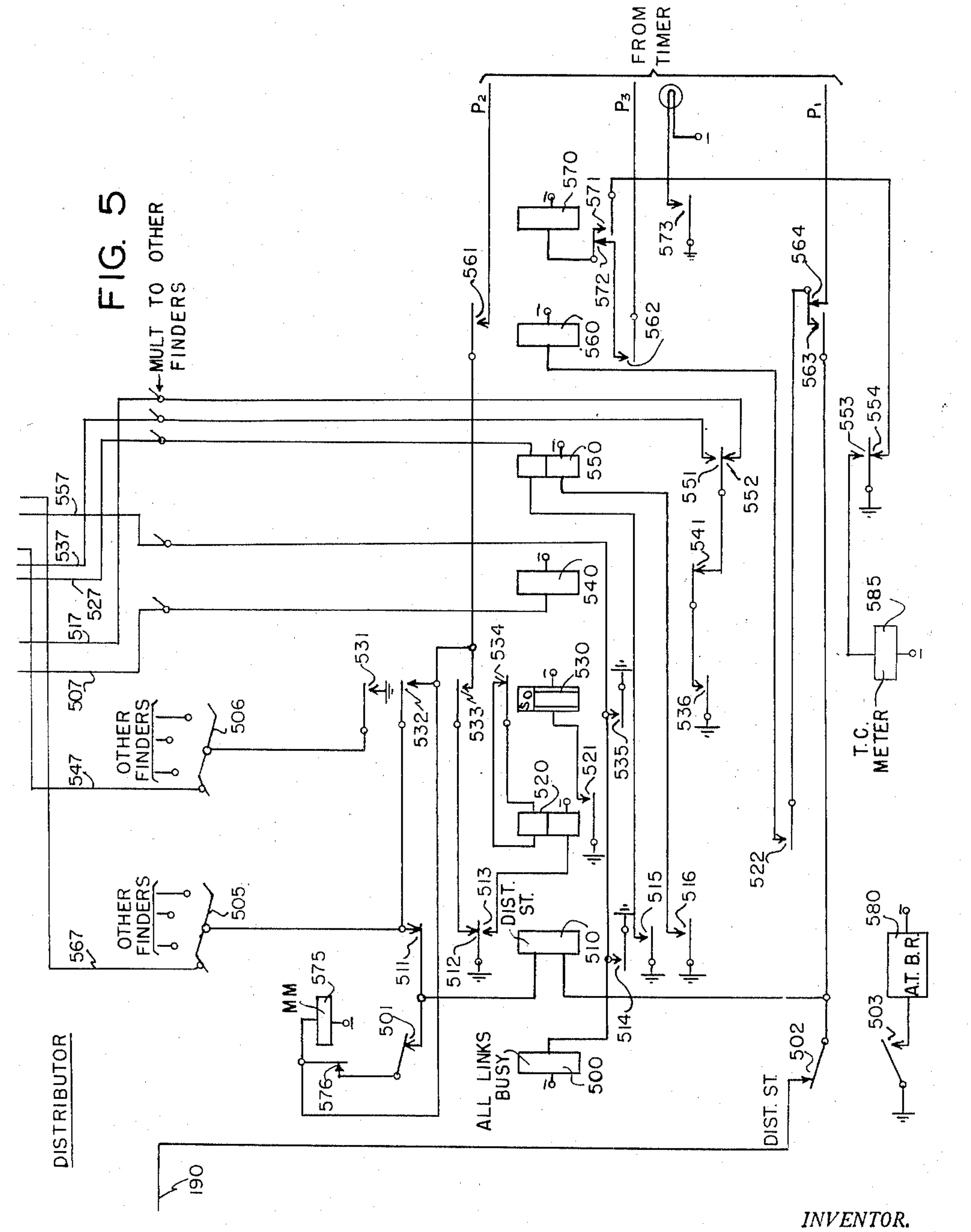
Figure 5 shows the distributor.

Referring now to Figure 5, the distributor as shown, is of the rotary type, pre-selecting the next free or idle finder-connector link after each normal operation. Therefore during normal operating periods of the exchange, the wipers of the rotary switch will be resting on an idle link. A busy link will apply a ground potential to the wipers and hence complete a circuit to the rotary switch motor magnet to cause the magnet to step its wipers off the grounded contact. Therefore, it will be seen that the motor magnet causes the switch to hunt for an absence of ground on its wipers.

It will be remembered that in the illustrated exchange, energization of all the rotary switch motor magnets only prepares the switch for stepping and that the actual stepping of the switch takes place upon the deenergization and release of the magnet.

The illustrated finder-connector link (Figures 3 and 4) has been drawn showing alternative connections to the finder and connector for an exchange including two-group conference service, or multi-group conference service, or code call service, the type of special service used being dependent on the requirements of each individual exchange.

Figure 3:
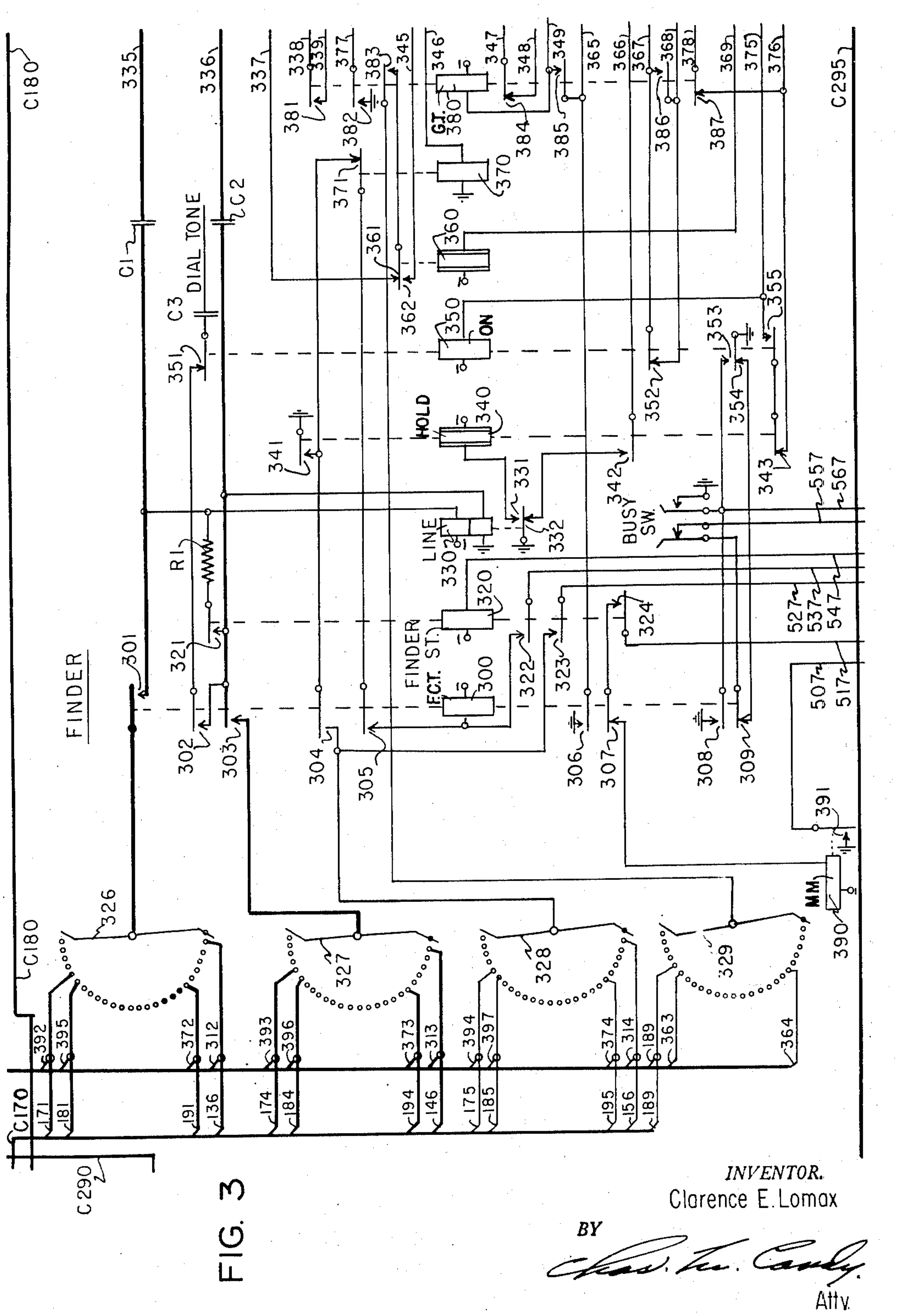
Figures 3 and 4 show one of the finder-connector links of the exchange.

Referring to Figures 6, 7, and 8 the finder (Fig. 6) of the code call equipment functions nearly the same as the line finder in Figure 3 with the exception that it searches for a ground potential by way of its extra control (EC) conductor instead of the control (C) conductor. The rotary switches shown in Figure 7 operate under pulsing during dialing of the code call number. As only the first five contacts of the above-named switches are used, and the code call number contains two digits; the number of codes that can be sent is limited to 25. Therefore, the maximum digital value that either digit can attain is 5. From the foregoing it will be understood that the lowest code call number will be 11 and the highest will be 55. The rotary switches in Figure 8 are of the previously mentioned 25 point type. The push button such as 865 may be conveniently located throughout the building or buildings within which the exchange is installed and may be operated for sounding special alarms such as fire, dismissal signals, etc. The alarms or gongs such as 870 and 880 (as many may be used as necessary) are also conveniently located so as to be clearly audible to everyone.

Referring to Figures 9 and 10 showing the multi-group conference equipment, the conference finder (Figure 9) functions the same as the code call finder. The 26 point rotary switch shown in Figure 10 responds to the group number dialed. As the switch is shown, it is wired for five conference groups, however, it may be wired to include ten conference groups, if desired. From the foregoing, it will be understood that the conference group call number is a single digit and may extend from 1 through 0, though the drawing shows it to be limited from 1 through 5.

The figure-number diagrams 11 through 15 show the arrangement of the drawings for regular, or local, calls and for each special service. It will be remembered that regular calls may be made with each special service or combination of special services.

A detailed operational description of regular calls and all special services will follow, references being had with the drawings which show sufficient apparatus as deemed necessary for each explanation.

*Regular P. A. X service*

The operation of the equipment (excluding all special services) as to the initiation and completion of a regular P. A. X call will now be discussed.

Figures 2, 11, 12, 13, 14, 15:
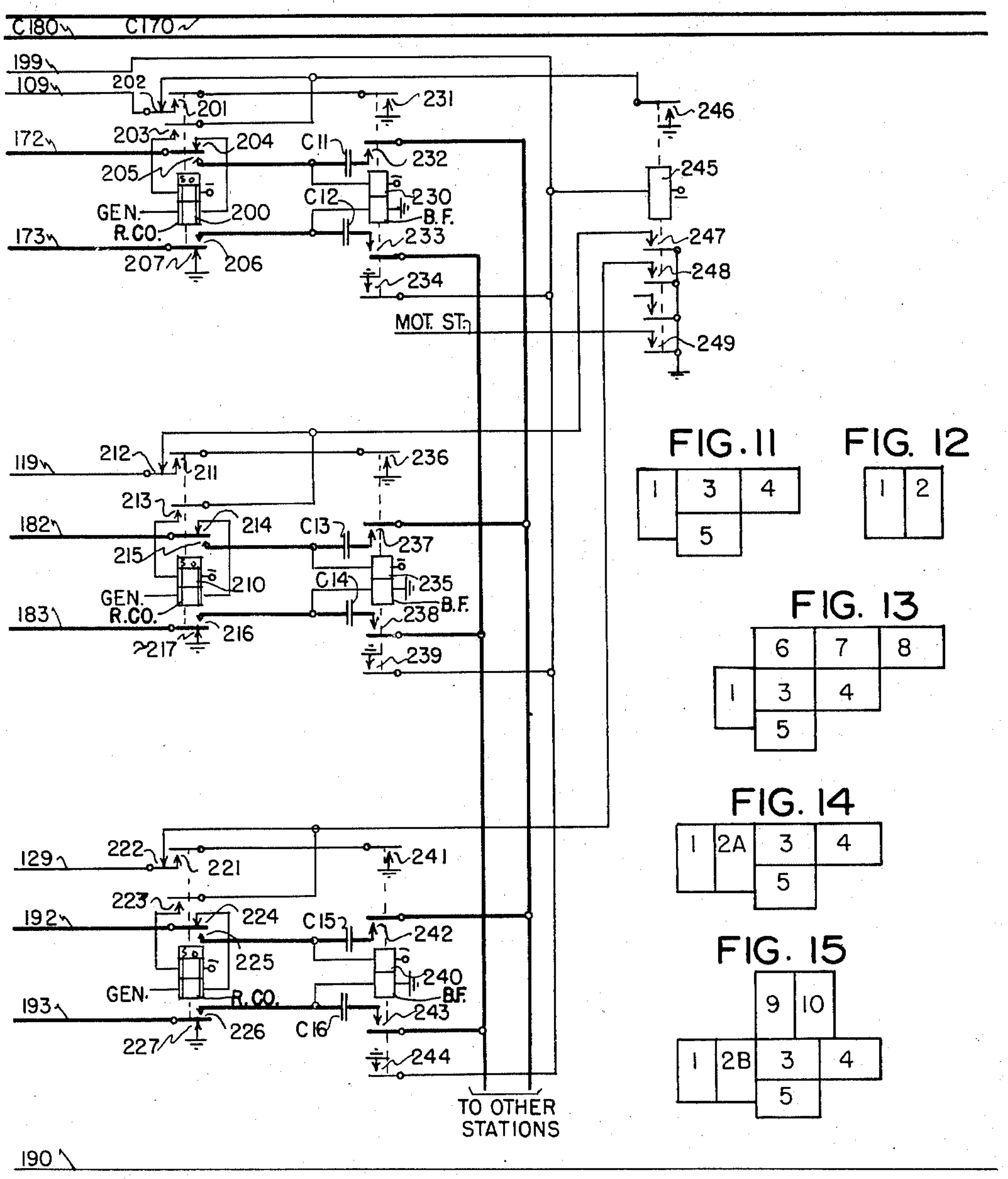

Referring in particular to the figure-number diagram of Figure 11 and its associated drawings comprising Figures 1, 3, 4, and 5, sufficient apparatus of the system is shown as deemed necessary for the explanation.

Assuming that subscriber B is given a designated call number such as 32 and that subscriber D desires to call subscriber B, the equipment will operate in the following manner:

When subscriber D removes the receiver, a loop is closed across his talking conductors and a circuit is completed to the line and cut-off relay 160, this circuit extending from ground at contacts 163, the associated positive talking conductor, the loop circuit, the associated negative talking conductor, contacts 161, upper winding of relay 160 and the lower winding of relay 160 to battery. As previously described, the relay 160 is a two-step line and cut-off relay having two serially connected windings, capable (during the present energization) of causing the relay 160 to close only the "*x*" contacts. At "*x*" contacts 162, relay 160 applies battery potential to the control conductor 156. At "*x*" contacts 165, relay 160 applies a ground potential to the distributor-start conductor 190, completing a circuit to the distributor-start conductor 190, completing a circuit to the distributor-start relay 510 (providing that the wipers of the distributor motor magnet 575 are resting on an idle finder-connector link), this circuit extending from ground at contacts 164, "*x*" contacts 165, conductor 190, contacts 502, high resistance winding of distributor-start relay 510, contacts 501, 576 and through the marginal winding of motor magnet 575 to battery. Magnet 575 will not operate in series with relay 510.

As previously mentioned, the distributor is of the rotary type and after each normal operation preselects the next idle or free finder-connector link, therefore wipers 505 and 506 of the associated motor magnet 575 will rest on an idle or free link. However, if all links were busy at the moment, the operating circuit of the all-links-busy relay 500 would be open due to the absence of ground potential (supplied by any idle or free link from ground at contacts such as 354 in Figure 3) on the conductor 557 to relay 500. Relay 500 would then restore and open the circuit to motor magnet 575 at contacts 501, thereby preventing motor magnet 575 from operating. However, as soon as a link becomes free, the ground potential is restored to the conductor 557 and relay 500 will operate and prepare a circuit to motor magnet 575. This circuit will be completed if wiper 505 is resting on a contact terminating the guard lead of a busy link, but if the wiper is resting on a contact terminating the guard lead of an idle link, the circuit will not be completed. As shown in Figure 5, the wipers 505 and 506 of magnet 575 are resting on the contacts of the illustrated finder-connector link (Figures 3 and 4) which is shown as idle.

In operating contacts 511, distributor start relay 510 opens a point in the energizing circuit of motor-magnet 575, at contacts 512 ground is removed from a secondary "kick-off" circuit which is under control of the calling subscriber and relay 530, at contacts 513 a circuit is completed for relay 520 which at the moment is slightly slow to operate due to its short circuited upper winding. At contacts 514 relay 510 applies a ground to the multiple circuit for maintaining relay 500 operated, at contacts 515 prepares an operating circuit for the relay 550 and at contacts 516 completes an obvious preenergizing circuit for relay 550. Resistance R2 is high enough to prevent relay 550 from operating, but making relay 550 quick-acting to any "splash" of current through its upper winding and operative for any such "splash."

In operating, relay 520 completes a circuit for the slow to operate relay 530, from ground at contacts 521 and at contacts 522 prepares a circuit for relay 560.

In operating relay 530 completes a circuit to the finder-start relay 320 (Figure 3) at contacts 531, this circuit extending from ground at contacts 531, wiper 506 and its associated contact, conductor 547 and the winding of relay 320 to battery. At contacts 532 relay 530 prepares a circuit for motor-magnet 575, at contact 533 a "kick-off" circuit is prepared for motor-magnet 575, at contacts 534 the circuit of the upper winding of relay 520 is opened, thereby giving relay 520 a normal quick restoring time interval. At contacts 535 relay 530 connects a ground to the multiple circuit of relay 500 and applies ground at contacts 536, thereby preparing circuits for motor magnet 390 and finder cut-through relay 300.

In operating contacts 321, relay 320 completes an obvious circuit for line relay 330 at contacts 322 a circuit is prepared for the finder cut-through relay 300, at contacts 323 a circuit is prepared for the preenergized relay 550 and at contacts 324 completes a circuit for the finder motor-magnet 390, this circuit extending from ground at contacts 536, contacts 541, 552, conductor 517, contacts 325, 307 and through the winding of magnet 390 to battery.

In operating contacts 331, line relay 330 completes an obvious circuit for the slow to release hold relay 340. In operating contacts 341, hold relay 340 prepares a circuit for operating the line and cut-off relay 160 completely, at contacts 342 a pulsing circuit is prepared to the connector motor-magnet 490 and at contacts 343 a point in the release circuit of the motor-magnet 490 is opened.

During the operation in the preceeding paragraph, magnet 390 in operating completes an obvious circuit to the interrupter relay 540 at contacts 391. Relay 540, in operating contacts 541, opens the previously traced operating circuit of magnet 390, allowing magnet 390 to restore. In restoring, magnet 390 advances rotary wipers 326, 327, 328 and 329 one step, and opens the circuit to relay 540 by way of contacts 391. In restoring, relay 540 again completes the previously traced circuit to magnet 390 by way of contacts 541. Magnet 390 reenergizes and at contacts 391 again completes the circuit to relay 540. Relay 540 energizes and at contacts 541 opens the circuit to magnet 390 allowing it to restore. In restoring, magnet 390 advances wipers 326, 327, 328 and 329 a second step and at contacts 391 again opens the circuit to relay 540 allowing it to restore. This interaction between magnet 390 and relay 540 continues until wiper 328 engages the contact terminating control conductor 156, at which time a circuit is completed for the preenergized relay 550, this circuit extending by way of ground at contacts 515, upper winding of relay 550, conductor 527, contacts 323, wiper 328 and its engaged contact, conductor 156, cable C—170, conductor 156, "*x*" contact 162 and the lower winding of relay 160 to battery.

In operating contacts 552, relay 550 opens the circuit to magnet 390 and at contacts 551 completes a circuit to the finder cut-through relay 300, this circuit extending from ground at contacts 536, contacts 541, 551 conductor 537, contacts 332 and the winding of relay 300 to battery. At contacts 553 an obvious circuit is completed to the total call meter 585 for registering each call and at contacts 554 a locking circuit of relay 570 is opened. It is to be remembered that wipers 326, 327, and 329 are also resting on contacts in their respective banks corresponding to the contact upon which wiper 328 is resting.

In operating contacts 301 and 303, finder cut-through relay 300 completes the extension of the talking conductors from the calling line with the finder-connector link, at contacts 302 a circuit is completed for the transmission of dial tone out over the positive talking conductor to the calling station as an indication of readiness by the link to receive dialing. At contacts 304, relay 300 completes the circuit for the complete operation of relay 160, this circuit extending from ground at contacts 341, contacts 304, wiper 328 and its associated contact, conductor 156, cable C170, conductor 156, "X" contacts 162 and the lower winding of relay 160 to battery. The closing of contacts 304 also shunts the upper winding of relay 550, but since relay 550 has operated, it will remain so by the holding effect of its lower winding. The ground potential at contacts 341 busies subscriber D to other finders and is also applied to the rotary connector switch by way of conductor 166 to busy subscriber D to incoming calls. At contacts 305, relay 300 completes an obvious holding circuit for itself by way of ground at contacts 341. At contacts 306, relay 300 prepares a future locking circuit for relays 380 and 400, and supplies a working ground for various other relays in the finder-connector link, at contacts 307 the interrupting circuit to motor-magnet 390 is opened, at contacts 308 a circuit is completed for energizing motor-magnet 575, this circuit extending from ground at contacts 308, conductor 567, contact and engaged with wiper 505, contacts 532 and the winding of magnet 575 to battery, and at contacts 309 a point in the circuit of all-links-busy relay 500 is opened. In energizing, magnet 575 opens a point in the normal operating circuit of the distributor start relay 510 at contacts 576.

In operating completely (second-step), at contacts 161 and 163, relay 160 opens its previously traced first-step operating circuit, contacts 164 removes ground from the distributor start conductor 190 and relay 510 restores. In restoring contacts 511, relay 510 closes a point in the normal operating circuit of magnet 575, at contacts 513 the circuit to relay 520 is opened allowing it to restore, at contacts 514, a ground is removed from the multiple circuit of relay 500, at contacts 515 ground is removed from the previously opened circuit of relay 550 and at contacts 516 the preenergizing and hold circuit of relay 550 is opened, allowing relay 550 to restore. In restoring, relay 550 opens the energizing circuit of relay 300 at contacts 551 and at contacts 553 opens the circuit to meter 585. Relay 300, however, remains energized over its previously traced locking circuit.

In restoring, relay 520 opens the circuit to relay 530 at contacts 521. In restoring, relay 530 opens the circuit to relay 320 at contacts 531, at contacts 532 opens the holding circuit for magnet 575, allowing magnet 575 to restore and rotate its wipers one step. At contacts 535 a ground is removed from the multiple circuit to relay 500 and at contacts 536 the operating circuit of magnet 390 is further opened. Magnet 575 will rotate its wipers until wiper 505 encounters a contact (each corresponding to a finder-connector link) which contains no ground potential and stops thereon.

In restoring, relay 320 opens contacts 321 to remove the bridge from relay 330, but relay 330 remains operated from the closed loop of subscriber D. At contacts 322 the energizing circuit of relay 300 is further opened by relay 320, but relay 300 remains operated over a previously traced circuit from ground at contacts 341. At contacts 323 relay 320 further opens the operate circuit of relay 550 and at contacts 324 the energizing circuit of motor-magnet 390 is further opened.

As previously mentioned, dial tone has been transmitted back to the calling subscriber which is an indication that the desired number may be dialed and in this case the two-digit number 32 that has been assigned subscriber B will be dialed.

The tens digit 3 is dialed and the line relay 330 (energized at the beginning of dialing) will deenergize and energize upon receipt of each pulse, for a total of three times each. At the beginning of the first pulse and upon deenergizing, relay 330 opens the circuit to relay 340 at contacts 331, but relay 340 is slow-to-release and therefore holds operated during dialing. At contacts 332 a circuit is completed to relay 470 and motor-magnet 490, these circuits extending respectively from ground at contacts 332, contacts 342, conductor 366, contacts 487, 435, to the left over conductor 368, contacts 352, conductor 367 and the winding of relay 470 to battery and from ground at contacts 332, contacts 342, conductor 366, contacts 487, 435, to the right over conductor 368 and through the winding of magnet 490 to battery.

In operating, relay 470 completes an obvious circuit to relay 460 at contacts 471, at contacts 472 ground is removed from wipers 468 and 469 during the pulsing period and at contacts 473, relay 470 completes a circuit for itself effective during pulsing independent of the busy relay contacts 435. Motor-magnet 490 energizes and at contacts 491 opens a point in its interrupter circuit. The interrupter springs of the dialing mechanism have closed and the circuit is again completed to line relay 330 which reenergizes thus releasing magnet 490 and ending the first pulse. In operating contacts 462, relay 460 prepares a circuit to the busy relay 430 and at contacts 464 the pulsing circuit is maintained complete.

At the end of the first pulse and in operating, relay 330 closes the circuit to relay 340 at contacts 331 and at contacts 332 opens the pulsing circuit to motor-magnet 490 and relay 470. Relay 470 remains operated, however, due to its slow-to-release characteristics.

As previously stated, wipers 465 to 469, inclusive, are resting on the "home" or 26th position of the rotary switch actuated by motor-magnet 490, therefore, as magnet 490 restores, wipers 465 to 469 inclusive are advanced one step, with the lower halves of the wipers disengaging their respective contacts and the upper halves of the wipers engaging the first contact of each bank. Off-normal springs 475 close as the wipers leave their home positions and complete a circuit to relay 350.

In operating contacts 351, relay 350 removes dial tone from the calling line, at contacts 352 the former energizing circuit for relay 470 is opened, at contacts 353 a ground is maintained on the conductor from the seized finder to a contact of wiper 505, at contacts 354 ground is removed from the conductor to the all-links-busy relay 500 and at contacts 355 a point in the self-interrupter circuit to magnet 490 is prepared.

At the beginning of the second pulse, the circuit to line relay 330 is again opened, which upon deenergizing completes the formerly traced energizing circuit to motor-magnet 490 and the holding circuit to relay 470 at contacts 332. However, the circuit path to the latter has been altered with the respect that closed contacts 473 have replaced opened contacts 352. This has no apparent effect because as previously stated, relay 470 remains operated during pulsing of each digit dialed. Magnet 490 energizes and opens its self-interrupter circuit at contacts 491. This interrupter circuit has no effect on the operation at the present and will be discussed later. At the end of the second pulse line relay 330 again energizes and opens the circuit to magnet 490 at contacts 332. In restoring, magnet 490 rotates wipers 465 to 469 inclusive, a second step, at which time the wipers are resting on the second contact of the wiper's respective banks.

At the beginning of the third pulse, line relay 330 again deenergizes and completes a conduit, by way of contacts 332, to motor-magnet 490 which then energizes. At the end of the third pulse relay 330 again energizes and opens the circuit to magnet 490 at contacts 332. In restoring, magnet 490 rotates wipers 465 to 469 inclusive, a third step, at which time the wipers are resting on the third contact of the wipers' respective banks. The dialing of the tens digit 3 has now been completed and the circuit to relay 470 has been opened at contacts 332, thus relay 470 will restore before the second digit has been dialed.

In restoring, relay 470 opens the circuit to relay 460 at contacts 471, thereby allowing relay 460 to restore, at contacts 472 ground is restored to wipers 468 and 469 and a circuit is thereby completed to relay 400, this circuit extending from ground at contacts 306, conductor 365, contacts 472, wiper 468 and engaged contact, conductor 348, contact 384 and through the winding of relay 400 to battery. In restoring contacts 461, relay 460 prepares a circuit for the lower winding of relay 480, at contacts 462 the circuit to the busy relay 430 is opened.

In operating contacts 402 and 404, relay 400 has prepared for ringing current to be transmitted over the positive talking conductor, which eventually will serve to cause the ringer of station B to operate. As the ringer for station B' is on the opposite side of the line, this ringer will not operate. At contacts 405, relay 400 completes its own obvious locking circuit and at contacts 406 a circuit is completed to motor magnet 490, this circuit extending from ground at contacts 306, conductor 365, contacts 472, wiper 469 and its engaged contact, contacts 406, conductor 378, contacts 387, conductor 376, contacts 488, 491 and the winding of magnet 490 to battery.

In operating, magnet 490 opens its own energizing circuit at contact 491 and thereby restores. In restoring, magnet 490 rotates wipers 465, to 469 inclusive, one step and closes contacts 491, but the circuit to magnet 490 is now open as wiper 469 is resting on an unused (fourth) contact. However, as wiper 468 engages its next (fourth) contact a circuit is completed to relay 380, this circuit extending from ground at contacts 306, conductor 365, contacts 472, wiper 468 and its engaged contact, conductor 349 and through the winding of relay 380 to battery.

In operating contacts 381 relay 380 prepares a circuit for the cut-through relay 480, at contacts 382 a circuit is prepared for the lower winding of the switch-through relay 480, at contacts 383 a circuit is prepared for "Executive cut-in" which will be discussed later, at contacts 384 the operate circuit of relay 400 is opened, at contacts 385 a locking circuit is completed for relay 380, at contacts 386 a circuit is prepared for relay 470 and at contacts 387 the line-group interrupter circuit to magnet 490 is opened.

Before continuing with the present description, it is thought that the busy test circuit should be described more in detail. When calling into the first line group, as either the first digits 3 or 4 of the call number are dialed, relay 380 is operated and at contacts 381 completes a busy test circuit to the busy relay 430 from the 4th contact engaged with wiper 467, conductor 338, contacts 381, conductor 339 contacts 462 and through the winding of busy relay 430 to battery. Now, when calling into the second line group, as either the first digits 5 or 6 the call number are dialed, relay 380 is not operated (because contacts 5 and 6 correspond to lines of the first group which may be busy at the time) until magnet 490 has automatically stepped all its associated wipers to their 15th contacts, at which time relay 380 is operated and at contact 381 completes the above traced busy test circuit. It will be noted that when the first digit of the call number to either line group is 3 or 5, relay 400 will operate to reverse the ring. When the first digit 3 is dialed and after relay 400 operates, magnet 490 steps its wipers to the 4th contacts to operate relay 380. When the first digit 5 is dialed and after relay 400 operates, magnet 490 steps its wipers to the 6th and subsequently to the 15th contacts before relay 380 operates.

The system is now ready for the second or units digit 2, of the call number 32, to be dialed. As the digit 2 is dialed, line relay 330 (energized at the beginning of dialing) will deenergize and energize upon receipt of each pulse, for a total of two times each. At the beginning of the first pulse and upon denergizing, relay 330 opens the circuit to relay 340 at contacts 331, but as relay 340 is slow-to-release, it will hold operated during dialing. At contacts 332 a circuit is completed to relay 470 and motor-magnet 490, these circuits extend respectively; from ground at contacts 332, contacts 342, conductor 366, contacts 487, 435, to the left over conductor 368, contacts 386, conductor 367 and through the winding of relay 470 to battery; from ground at contacts 332, contacts 342, conductor 366, contacts 487, 435, to the right over conductor 368 and through the winding of magnet 490 to battery.

In operating contacts 471, relay 470 completes a circuit to relay 460, at contacts 472 ground potential is removed from wipers 468 and 469 relays 380 and 400 are locked operated to grounded conductor 365; and at contacts 473 relay 470 slightly alters its previous operate circuit. In operating, magnet 490 opens a point in its interrupter circuit. At the end of the first pulse and in operating, relay 330 opens the circuits to relay 470 and magnet 490. Relay 470, however, is slow-to-release and does not restore during pulsing. In operating contacts 462, relay 460 prepares a circuit for busy relay 430 and at contacts 464 the pulsing circuit is maintained complete in case busy relay 430 should operate before pulsing is completed.

At the beginning of the second pulse and in releasing, relay 330 completes the circuit to magnet 490. Magnet 490, in operating, opens its interrupter circuit at contacts 491 which again have no effect at the present. At the end of the second and final pulse, relay 330 energizes and opens the circuit to magnet 490 and relay 470 at contacts 332. In restoring, magnet 490 rotates wipers 465 to 469 inclusive, another step. It will be remembered that at the beginning of the last digit to be dialed, wipers 465 through 469 were resting on the fourth contact of each respective wiper-bank and that the second digit 2 caused the wipers to rotate two additional steps, so now it is evident that the wipers are resting on the sixth contact of each respective bank.

In restoring, relay 470 opens the circuit to the slave relay 460 at contacts 471, at contacts 472 ground is restored to wipers 468 and 469 with no effect and at contact 473 the holding circuit of relay 470 is opened. During the time that wiper 467 first engages its sixth contact and before the relay 460 has restored, a busy-test of the called line is made. If the called line should be busy, a ground would be impressed on the called lines control conductor by contacts such as 484 of its associated seized connector. This ground would be encountered by wiper 467 at its sixth contact and complete a circuit to the busy relay 430, this circuit extending from wiper 467 conductor 338, contacts 381, conductor 339, contacts 462 and the winding of relay 430 to battery. Relay 430, in operating, would close contact 431 for transmitting busy tone out over the positive talking conductor to the calling subscriber, a more detailed description of connection to a busy line being described hereinafter. However, for the present operation, it will be assumed that the called line is not busy, therefore no ground will be encountered by wiper 467, and busy relay 430 will not operate.

In restoring, at contacts 461 relay 460 completes an operative series circuit to the cut-through relay 480 by way of its lower winding and the line and cut-off relay 140 this circuit extending from ground at contacts 382, conductor 377, down to contacts 455, contacts 432, through the lower winding of relay 480, contacts 486, 461, conductor 339, contacts 381, conductor 338, wiper 467 and its associated contact terminating conductor 186, cable C180, conductor 186, contacts 118 and the lower winding of relay 140 to battery. In operating, relay 140 opens the circuit to its upper winding at contacts 141, at contacts 142 ground is removed from the positive talking conductor, at contacts 143 subscriber B is busied at the finder banks, and at contacts 144, ground is removed from the distributor start conductor to prevent the distributor from starting a finder.

In operating, relay 480 first closes "x" contacts 485 and completes an operative locking circuit for relay 480 by way of its upper winding, this circuit extending from ground at contacts 382, conductor 377, "x" contacts 485 and through the winding of relay 480 to battery. At contacts 481, relay 480 prepares a circuit for ring-back tone, at contacts 482 and 483 the talking conductors of the called subscriber are connected with those of the seized connector and a circuit is completed for ringing current, this circuit extending from the grounded ringer of subscriber B, the positive talking conductor, contacts 112, 116, conductor 184, cable C180, conductor 184, sixth bank contact engaged with wiper 466, contacts 483, 424, 402 and down through the lower winding of the ring cut-off relay 420 to interrupted generator. At contacts 484, relay 490 applies a ground to prepare a circuit through the upper winding of relay 420 and also provides an additional busying ground on the control conductor of subscriber B. At contacts 486, relay 480 opens the energizing circuit through its lower winding, at contact 487 the pulsing circuit is opened and at contacts 488 the interrupter circuit to motor-magnet 490 is opened.

After a normal interval of ringing over the previously traced circuit at station B, subscriber B answers the call by removing his receiver. The removal of the receiver at station B closes the switch-hook springs (not shown) at the station and completes a direct current circuit through the lower winding of ring cut-off relay 420 for operating the relay. This circuit extends from ground at contacts 404, 421, 482, wiper 465 and its engaged sixth contact, conductor 181, cable C180, conductor 181, contacts 113, 111, negative talking conductor, switch-hook springs at station B, positive talking conductor contacts 112, 116, conductor 184, cable C180, conductor 184, wiper 466 and its engaged sixth contact, contacts 483, 424, 402 and through the lower winding of relay 420 to battery at interrupter generator.

In operating, relay 420 locks itself operated by closing its "x" contacts 426, this circuit extending from ground at contacts 484, conductor 338, contacts 381, conductor 339, "x" contacts 426 and through the upper winding of relay 420 to battery. At contacts 423, and 424, ring-back tone and ringing current are removed from the calling and called line respectively, at contacts 422, and 425 the back bridge relay 410 is connected across the called line and the talking conductors of the calling and called line are connected so that conversation may proceed. Line relay 330 supplies talking battery for the calling party and back bridge relay 410 supplies talking battery for the called party.

After completion of conversation, both stations B and D replace their receivers. The replacing of the receiver at station D disconnects the equipment in the following manner:

The circuit is opened to line relay 330 which restores and opens the circuit to the hold relay 340 at contacts 331. Relay 340, in restoring, releases contacts 341 and opens the locking circuit to relay 300, and at contacts 343 prepares the self interrupted "homing" circuit of motor-magnet 490. The removal of ground at contacts 341 also releases line and cut-off relay 160. In restoring, relay 300 opens the locking circuits of relays 380 and 400 at contacts 306 and at contacts 308 removes one of the ground connections from guard lead 567. Relay 380, in restoring removes ground from conductors 377 and 339 by way of contacts 381 and 382, thereby opening the circuits to relays 420 and 480. In restoring contacts 484, relay 480 opens the circuit to relay 140, which restores and at contacts 488 completes the "homing" circuit to magnet 490, this circuit extending from ground at off-normal springs 475, conductor 375, contacts 355, 343, conductor 376, contacts 488, 491 and through the winding of magnet 490 to battery. Magnet 490 energizes and opens its circuit repeatedly until it has stepped wipers 465 to 469 inclusive to the 26th or "home" position, at which time off-normal springs 475 open and the circuits to magnet 490 and relay 350 are maintained open. Relay 420 has restored and the equipment is again at rest and ready for future calls.

*Executive cut-in*

Station A' is shown as being assigned to an executive and is equipped with a non-locking key such as 178, which provides the executive with "executive cut-in" on busy lines. This special feature will function as described in the following paragraphs.

It will be assumed that the subscriber at station B has received or initiated a call and is in a busy condition. A finder-connector identical to the one shown in Figures 3 and 4 will be in use and associated with station B.

Assuming further that this particular executive desires to call station B, his call will be initiated and handled in the same manner as described in the section entitled "Regular P. A. X service," but stopping at the point in the operation where the last digit 2 of the call number 32 has been dialed and before the release of the slave relay such as 406. It will also be assumed that the illustrated finder-connector link in Figures 3 and 4, will be used in handling the call placed by said executive.

Continuing now with the explanation: After the last pulse of the dialed digit 2 has been received and motor-magnet 490 has advanced wipers 465 to 469 inclusive, the wipers are engaged with their respective sixth contacts. The circuit to relay 470 has been opened at contacts 332 by the line relay 330 and relay 470 restores.

In restoring, relay 470 opens the circuit to slave relay 460, but relay 460 is slow to release and does not restore immediately, thereby utilizing this time interval to test for busy. As previously stated, station B is busy and therefore wipers 467 will encounter ground at its sixth contact which then completes a circuit for the busy relay 430, this circuit extending from the grounded control conductor, wiper 467 and engaged contact, conductor 338, contacts 381, conductor 339, contacts 462 and the winding of relay 430 to battery.

In operating contacts 431, relay 430 completes a previously traced busy tone circuit to station A', at contacts 432 an energizing circuit is opened to the lower winding of relay 480 and at contacts 433, relay 430 prepares a locking circuit for itself. In restoring as the armature of contact 462 starts to release, a locking circuit is completed for relay 430 by relay 460, this circuit extending from ground at contacts 382, conductor 377, contacts 455, 433, 456, 463 and through the winding of relay 430 to battery.

After hearing busy tone, the executive momentarily depresses his non-locking key 178, thus completing a circuit to the cut-in relay 450, this circuit extending from ground at key 178, conductor 189, cable C170, conductor 189, the fifth contact of the rotary finder switch and wiper 329, contacts 383, 361, conductor 337, contacts 443 and the winding of relay 450 to battery.

In operating, relay 450 completes the extension of station A' with station B at contacts 451 and 453, at contacts 452, busy tone is removed from the calling line, at contacts 454 and 455 the holding circuit of relay 430 is changed back to the original busy ground on the contact of the called line and at contacts 456 a circuit is completed for relay 440 in series with relay 430. The circuit for these two relays may be traced as follows: From ground on wiper 467, conductor 338, contacts 381, conductor 339, contacts 454, 433, the winding of relay 440, contacts 463 and the winding of relay 430 to battery. In operating, relay 440 supplies a holding ground for the relay 450 by way of contacts 442.

The executive has been connected with station B and condensers C4 and C5 may serve as monitoring or talking condensers. The executive may continue to converse with station B or he may request that both parties hang up their receivers, at which time, the busy relay 430 and relay 440 will restore and the cut-through relay 480 will operate and station B is rung and connected directly with the executive, when B answers the ring, in the usual manner. With a small exchange and a limited number of finder-connector links available, the first method is not desirable, because two links would be in use for the duration of the conversation. For that reason, the second method is preferred, because only one link is used and the other is released to handle other calls. Therefore when station B and his called party release their finder-connector link, station B no longer is busy and ground is removed from wiper 467 and relays 430, 440 and 450 restore and at the same time complete a circuit through the lower winding of relay 480 over a path previously traced in the section entitled "Regular P. A. X service." The remaining operation of the equipment and the release of the equipment is the same as described in the above-mentioned section.

It will be noted that this special type of service entitles the executive to cut-in over all regular calls.

Figure 4:
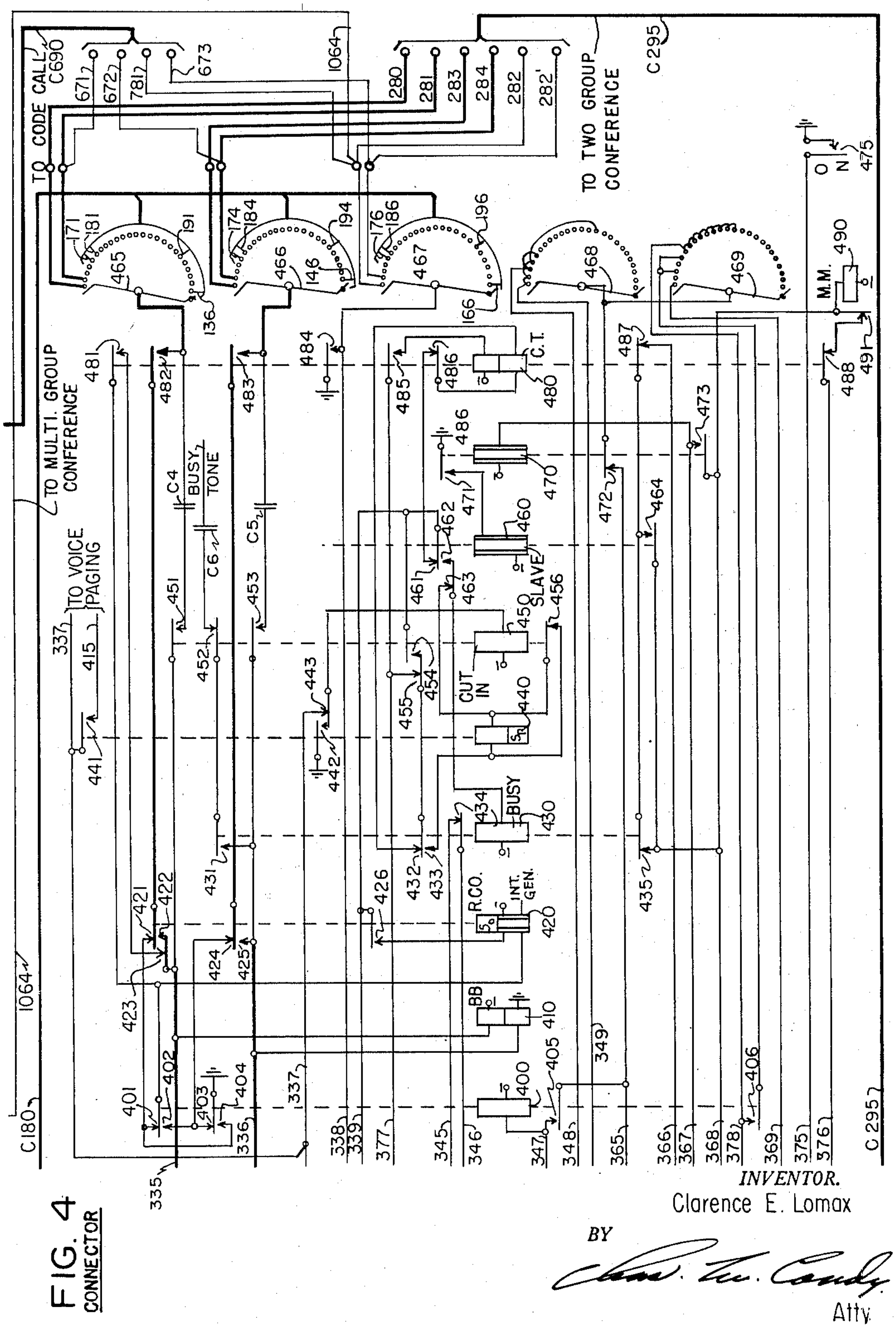

At the top of Figure 4 are shown two conductors 337 and 415 labeled thusly—"To voice paging." The voice paging equipment is not shown, however, due to certain requirements of the exchange, voice paging may be desired for some stations. A key (such as 178 shown at station A') may be used to start the voice paging equipment in the following manner: when the key such as 178 is depressed, operations of the equipment shown in Figures 1, 3 and 4 will take place as described in the above section up to and including the operation of relay 440, at which time the closing of contacts 441 completes a circuit to the start relay (not shown) of the voice paging equipment. This circuit may be traced as follows: from ground at key 178, conductor 189, cable C170, conductor 189, the 5th contact engaged with wiper 329, contacts 383, 361, conductor 337, contacts 441, conductor 415 and through the winding of the voice paging start relay (not shown) to battery. The start relay then locks operated to conductor 337, by-passing contacts 441.

Upon completion of the voice paging, the operated equipment in Figures 1, 3 and 4 restore as described in the above section.

*Code call*

The ensuing description of the equipment will cover the addition of the special service feature "Code call" to the system. This feature is illustrated in Figures 6, 7 and 8 and will be used in combination with Figures 1, 3, 4 and 5, including occasional references to the previous section entitled "Regular P. A. X service."

It will be remembered that certain subscribers whom it is desired to page by code ringing of the code call equipment, are assigned individual designated two-digit code call numbers and that any subscriber wishing to initiate a code call must prefix the single digit "1" to the code call number of the desired subscriber. Only certain stations having their extra control (E. C.) conductor marked, by having it connected to the code call finder, can initiate a code call, whereas a code call may be answered from any station of the system. The prefix digit "1" should be dialed, then a slight pause to wait for a second dial tone before dialing the code call number. Also, it is to be remembered that the code call may be answered by dialing the single digit "2."

It will be assumed that the subscriber at station A' is an executive and has been assigned the code call number "33." Assuming also that the subscriber at station C' wishes to talk with the executive and has dialed the executive's regular call number "41," but has been informed by his secretary that he is somewhere at large about the building. The subscriber at station C' can now initiate a code call for the executive by momentarily replacing his receiver, then removing it and dialing the digit "1" and waiting for dial tone, prior to dialing the code call number "33."

The operation of the equipment up to and including the dialing of the digit "1" is the same as that in the section entitled "Regular P. A. X service." A short review upon completion of dialing the digit "1" will reveal that wipers 465 through 469 have been advanced to engage their respective first contacts; relay 470 has restored contacts 472 and completed circuits to relays 380 and 360 and also opened the circuit to relay 460, the circuit for relay 360 extends from ground at contacts 306, conductor 365, contacts 472, wiper 469 and engaged first contact, conductor 369 and the winding of relay 360 to battery; relay 460 in restoring contacts 461 completes a circuit for the lower winding of relay 480 to operate in series with parallel connected relays 630 and 640 of Figure 6, this circuit extending from ground at contacts 382, conductor 377, contacts 455, 432, lower winding of relay 480, contacts 486, 461, conductor 339, contacts 381, conductor 338, wiper 467 and engaged first contact, conductor 781, cable C690, conductor 781, contacts 731, 752, conductor 608, contacts 651 and the windings of relays 630 and 640 to battery. In operating contacts 361, executive cut-in privileges are removed by relay 360, and at contacts 362 prepares an operating circuit for relay 370 and the code call finder. In operating, relay 480 completes its own locking circuit by way of its upper winding and "x" contacts 485 over an obvious path, at contacts 484 a maintaining ground is applied for the relays 630 and 640, and at contacts 487 opens the pulsing circuit to motor magnet 490.

In operating, relay 640 operates at the same time or ahead of relay 630, thereby preventing relay 650 from operating at the present time by opening contacts 641. At contacts 631, relay 630 completes a circuit for relay 610, this circuit extending from ground at contacts 631, contacts 621, 666 and the winding of relay 610 to battery. Contacts 631 also close a preenergizing circuit for the upper winding of relay 620 through resistor R3 which renders relay 620 extremely fast to operate. At contacts 632 a battery potential is applied for marking the extra control conductor to prepare for stopping the code call finder on the calling line, and at contacts 633 a circuit is prepared for the relay 650.

In operating, relay 610 completes an obvious circuit for the motor magnet 665 at contacts 611. Magnet 665, in operating, opens the circuit to relay 610 by way of contacts 666. In restoring, relay 610 opens the circuit to magnet 665 at contacts 611. In restoring, magnet 665 completes the circuit to relay 610 by way of contacts 666 and rotates wipers 613 through 616 one step. Relay 610 again completes the circuit to magnet 665 at contacts 611 and magnet 665 then opens the circuit to relay 610 at contacts 666. In restoring contacts 611, relay 610 opens the circuit to magnet 665 and in restoring, magnet 665 again completes the circuit to relay 610 at contacts 666 and again rotates wipers 613 through 616 one more step. This inter-action continues until the last release of magnet 665 rotates wiper 616 to engage the contact terminating conductor 364, at which time a circuit is completed for the preenergized relay 620 in series with relay 370, this circuit extending from ground at relay 370 and through its winding, conductor 346, contacts 434, conductor 345, contacts 362, 383, wiper 329 and engaged contact, conductor 364, cable C311, conductor 364, the contact engaged by wiper 616, lower winding of relay 620 and contacts 632 to battery. Relay 620 operates before relay 610 has had time to reoperate and opens the circuit to relay 610 at contacts 621, at contacts 622 the resistance R—3 is shunted to complete an obvious locking circuit for relay 620 by way of its upper winding and at contacts 623 a ground is applied to the control conductors of station C' to maintain the line and cut-off relay 150 operated and to busy station C' to all incoming calls.

In operating contacts 371, relay 370 initiates the release of the illustrated finder-connector link (which has been seized by station C') by releasing relay 300, which now disconnects the talking conductors of station C' from the line relay 330 of the regular finder-link at contacts 301 and 303 and at contacts 306 ground is removed from conductor 365 allowing relay 380 to restore. Line relay 330 restores and opens the circuit to slow to release relay 340. Relay 380 opens the locking circuit of relay 480 at contacts 382 and at contacts 383 opens the circuit to the lower winding of relay 620 which now remains operated over its upper winding, the same contacts (383) open the circuit to relay 370. In restoring contacts 484, relay 480 removes the holding ground from relays 630 and 640 and at contacts 488 the self-interrupting circuit for motor magnet 490 is prepared. Relay 340 now has restored and at contacts 343 completes the self-interrupting circuit for motor magnet 490. Magnet 490 restores wipers 465 through 469 to their "home" position in the manner as described in the section entitled "Regular P. A. X service," and off-normal springs 475 are opened, thereby breaking the circuit to relay 350. The finder-connector link is now completely restored and conditioned to handle future calls.

Referring now to the code call equipment, relay 640 restores ahead of the slow-to-release relay 630, thereby completing an obvious circuit to relay 650 by way of contacts 641. In operating, at contacts 651, relay 650 further opens the circuit to relays 630 and 640, at contacts 652 ground is applied to the control conductor 781 for busying the code call equipment, at contacts 653 a point in an alarm circuit is opened, at contacts 654 and 655 the talking conductors of the calling station C' are bridged across and operate line relay 660 and at contacts 656 dial tone is projected out over the negative talking conductor in an obvious and well-known manner to indicate to the subscriber at station C' that the code call number 33 of station A' may be dialed. However, before dialing takes place, relay 660 completes an obvious circuit to the hold relay 700 by way of contacts 661. Relay 700, which remains operated during dialing, completes an obvious circuit to the relay 710 by way of contacts 701 and at contacts 702 prepares a point in the pulsing circuit. In operating, at contacts 711 relay 710 opens a point in the right hand winding of relay 750, at contacts 712 a point in the energizing and locking circuits of relays 720 and 730 is prepared, at contacts 713 a locking circuit for the relay 650 is completed before relay 630 is fully restored, at contacts 714 a circuit is prepared for relay 745, at contacts 715 a ground is applied to the control conductor to serve as the previously mentioned ground applied by the relay 620 at contacts 623, and at contacts 716 a point in the left hand winding of relay 750 opened. Relay 630 now restores and at contacts 631 opens the circuit to relay 620, at contacts 632 the battery potential is removed from the extra control (EC) conductor and at contacts 633 the original energizing circuit to the relay 650 is removed. In releasing, relay 620 removes the ground from the control conductor at contacts 623, however this conductor remains grounded at contacts 715.

The first digit "3" of the code call number "33" is now dialed and line relay 660 responds to the three dial pulses in a well-known manner. At the beginning of the first pulse, relay 660 restores and at contacts 662 completes circuits to relay 745 and motor magnet 760, these circuits extending respectively from ground at contacts 662, conductor 648, contacts 702, conductor 668, contacts 604, conductor 678 and (1) down through contacts 714, 738 and through the winding of relay 745 to battery, (2) to the right through contacts 726 and up through the winding of motor magnet 760 to battery. Relay 745 is slightly slow to release and therefore remains operated only during pulsing. At contacts 746 relay 745 opens the energizing circuit to relay 720 during pulsing. Motor magnet 760 energizes and prepares to rotate its wipers 785, 786 and 787 one step upon deenergizing. At the end of the first pulse, relay 660 reenergizes and opens the circuits to relay 745 and motor magnet 760 at contacts 662. Relay 745, however, remains operated and in releasing, motor magnet 760 rotates its wipers 785, 786, and 787 one step.

At the beginning of the second pulse, relay 660 again releases and completes the previously mentioned circuit to relay 745 and magnet 760 via contacts 662, whereby magnet 760 energizes and prepares to rotate its wipers a second step. At the end of the second pulse, relay 660 reenergizes and opens the circuits to relay 745 and magnet 760 at contacts 662. Magnet 760 deenergizes and rotates its wipers a second step.

At the beginning of the third and last pulse of the first digit, relay 660 again releases and completes the previously mentioned circuits to relay 745 and magnet 760 via contacts 662, whereby magnet 760 energizes and prepares to rotate its wipers a third step. At the end of the third pulse, relay 660 reenergizes and opens the circuits to relay 745 and magnet 760 at contacts 662. Magnet 760 deenergizes and rotates its wipers a third step. Relay 745 in releasing after an interval completes an energizing circuit to the relay 720, this circuit extending from ground at contacts 601, conductor 628, contacts 712, 746, wiper 785 and engaged third contact, contacts 724 and the winding of relay 720 to battery. In operating at contacts 721, relay 720 opens the self-interrupting circuit of magnet 760, at contacts 722 an alarm circuit for the lamp 790 is prepared, at contacts 723, a locking circuit is completed and contacts 724 are opened to break the previous energizing circuit, at contacts 725 a pulsing circuit to the motor magnet 765 is prepared, at contacts 726 the pulsing circuit to motor magnet 760 is opened and at contacts 727, dial tone is removed from the calling line.

The second digit "3" of the code call number "33" is now dialed and line relay 660 responds to the three dial pulses as previously described. At the beginning of the first pulse, relay 660 releases and at contacts 662 completes circuits to relay 745 and motor magnet 765, these circuits extending respectively from ground at contacts 662, conductor 648, contacts 702, conductor 668, contacts 604, conductor 678 and (1) down through contacts 714, 738 and through the winding of relay 745 to battery, (2) to the right through contact 725, 737 and down through the winding of relay 765 to battery. Relay 745 is slightly slow to release and therefore remains operated only during pulsing. At contacts 746 relay 745 opens the energizing circuit to relay 730 during pulsing. Motor magnet 765 prepares to rotate its wipers 795, 796 and 797 one step upon deenergizing. At the end of the first pulse, relay 660 reenergizes and opens the circuit to relay 745 and motor magnet 765 at contacts 662. Relay 745, however, remains operated and in releasing, motor magnet 765 rotates its wipers 795, 796 and 797 one step.

At the beginning of the second pulse, relay 660 again releases and completes the previously mentioned circuits to relay 745 and magnet 760 via contacts 662, whereby magnet 765 energizes and prepares to rotate its wipers a second step. At the end of the second pulse, relay 660 reenergizes and opens the circuit to relay 745 and magnet 765 at contacts 662. Magnet 765 deenergizes and rotates its wipers a second step.

At the beginning of the third and last pulse of the second digit, relay 660 again releases and completes the previously mentioned circuits to relay 745 and magnet 765 via contacts 662, whereby magnet 765 energizes and prepares to rotate its wipers a third step. At the end of the third pulse, relay 660 reenergizes and opens the circuits to relay 745 and magnet 765 at contacts 662. Magnet 765 deenergizes and rotates its wipers a third step. Relay 745 in releasing completes an energizing circuit to the relay 730, this circuit extending from ground at contacts 601, conductor 628, contacts 712, 746, wiper 797 and engaged third contact, contacts 735 and the winding of relay 730 to battery. In operating contacts 732, relay 730 applies a ground to conductor 781 for busying the code call equipment to other initiated code calls, at contacts 733, an alarm circuit for the lamp 790 is prepared, at contacts 734 a locking circuit is completed and contacts 735 are opened to break the previous energizing circuit, at contacts 736 a marking ground is applied to wipers 787 and 795 and out over their respective conductors 773 and 778, at contacts 737 the pulsing circuit to magnet 765 is opened, at contacts 738 the energizing circuit to relay 745 is opened, at contacts 739 a circuit is completed for relay 820 and at contacts 740 a point in the self interrupter circuit to magnet 765 is opened. The circuit to relay 820 extends from ground at contacts 852, conductor 744, contacts 739, conductor 743, contacts 857, 803 and the winding of relay 820 to battery.

In operating contacts 821, relay 820 completes a circuit to the motor magnet 855, this circuit extending from ground at contacts 852, conductor 744, contacts 739, conductor 743, contacts 821 and through the winding of magnet 855 to battery. In operating contacts 857, magnet 855 opens the circuit to relay 820. Relay 820, upon restoring, opens the circuit to magnet 855 at contacts 821. Magnet 855 upon restoring, rotates its wipers 885, 886 and 887 one step and completes the circuit to relay 820 via contacts 857. In reoperating, relay 820 completes the previously traced circuit to magnet 855 at contacts 821. In operating, magnet 855 opens the circuit to relay 820 at contacts 857 and relay 820 in releasing contacts 821 opens the circuit to magnet 855. In restoring, magnet 855 rotates its wiper 885, 886 and 887 a second step and recompletes the circuit to relay 820 via contacts 857. In operating, relay 820 completes the circuit to magnet 855 by way of contacts 821 and in operating, magnet 855 opens the circuit to relay 820 by way of contacts 857. In releasing, relay 820 opens the circuit to magnet 855 by way of contacts 821 and in releasing, magnet 855 rotates its wipers 885, 886 and 887 a third step and completes the circuit to relay 820 at contacts 857. In operating, relay 820 completes the circuit to magnet 855 by way of contacts 821 and in operating, magnet 855 opens the circuit to relay 820 by way of contacts 857. In releasing, relay 820 opens the circuit to magnet 855 by way of contacts 821. In releasing magnet 855 rotates its aforementioned wipers a fourth additional step and at wiper 886 a circuit is completed for the relay 800, this circuit extending from ground at contacts 736, wiper 787 and its engaged third contact, conductor 773, fourth contact and engaged wiper 886 and through the winding of relay 800 to battery. Magnet 855 also completes a circuit to relay 820 by way of contacts 857, but as relay 820 is relatively slow-to-operate, relay 800 will operate and open the circuit to relay 820 at contacts 803. At contacts 801, relay 800 locks up to the ground at contacts 852 over the previously traced circuit, at contacts 802 a circuit is completed from ground at contacts 852 over the previously traced circuit to energize relay 810 and at contacts 804 a circuit is prepared for the relay 860. At contacts 811 relay 810 completes a circuit for relay 820 from the locking ground of relay 800 over an obvious circuit, at contacts 812 a splash of dial tone is sent out over the calling line, thereby permitting the caller to know that the code machine is sending out the code.

In operating, relay 820 completes a circuit to the motor magnet 855 by way of contacts 821. In operating, motor magnet 855 closes contacts 856 and completes a circuit to relay 860 and at contacts 857 opens the circuit to relay 810. Relay 860 closes contacts 861 and completes a circuit to the audible code sounders such as 870 and 880 for causing them to make a single stroke. In restoring, relay 810 opens the circuit to relay 820 by way of contacts 811 and relay 820 in restoring, opens the circuit to magnet 855 by way of contacts 821. In restoring, magnet 855 opens the circuit to relay 860 at contacts 856, at contacts 857 completes the circuit to relay 810 and magnet 855 steps wipers 885, 886 and 887 to the fifth contacts. Relay 860 at contacts 861 opens the circuit to the code sounders 870 and 880.

In operating, relay 810 completes a circuit to relay 820 by way of contacts 811 and relay 820 completes a circuit to magnet 855 by way of contacts 821. In operating, magnet 855 completes a circuit to relay 860 by way of contacts 856 and at contacts 857 opens the circuit to relay 810. Relay 860 completes the circuit to code sounders 870 and 880 at contacts 861 to cause the sounders to make a second stroke. In restoring, relay 810 opens the circuit to relay 820 at contacts 811 and in restoring, relay 820 opens the circuit to magnet 855 at contact 821. On restoring, magnet 855 opens the circuit to relay 860 at contacts 856, at contacts 857 a circuit is completed to relay 810 and magnet 855 steps wipers 885, 886 and 887 to the sixth contacts. Relay 860 again restores to open the circuit to the sounders 870 and 880.

In operating, relay 810 completes a circuit to relay 820 by way of contacts 811 and relay 820 completes a circuit to magnet 855 by way of contacts 821. In operating, magnet 855 completes a circuit to relay 860 by way of contacts 856 and at contacts 857 opens the circuit to relay 810. Relay 860 completes the circuit to code sounders 870 and 880 at contacts 861 to cause the code sounders to make a third stroke. In restoring, relay 810 opens the circuit to relay 820 at contacts 811 and in restoring relay 820 opens the circuit to magnet 855 at contacts 821. In restoring, magnet 855 opens the circuit to relay 860 at contacts 856, at contacts 857 a circuit is completed to relay 810 and magnet 855 steps wipers 885, 886 and 887 to the seventh contacts. Relay 860 again restores to open the circuit to the sounders 870 and 880.

As wiper 886 engages its seventh contact the locking ground potential of relay 800 is applied to the other side of the relay 800 which is then shunted out and releases. In releasing relay 800 opens its locking circuit at contact 801, at contacts 802 the circuit is opened to relay 810, at contacts 803 the previous energizing circuit of relay 820 is completed and at contacts 804 the circuit to relay 860 is opened.

The strokes from the code sounders 870 and 880 follow each other in unison during the first half of the code ringing, then a slight pause occurs while the wipers engage the seventh bank contact and which then starts the second half of the ringing code when the wipers engage the eighth contact.

In operating, relay 820 completes a circuit to magnet 855 at contacts 821 and in operating, magnet 855 opens the circuit to relay 820 at contacts 857. In restoring, relay 820 opens the circuit to magnet 855 at contacts 821 and in restoring, magnet 855 completes the circuit to relay 820 at contacts 857 and magnet 855 steps wipers 885, 886 and 887 to the eighth contacts.

When wiper 886 engages its eighth contact which is grounded, an obvious circuit is completed to the relay 800. As relay 820 is relatively slow-to-operate, relay 800 will operate ahead of relay 820 thus opening the circuit to relay 820 at contacts 803 and completing a circuit to relay 810 at contacts 802 over a previously traced circuit. At contacts 801, relay 800 locks itself energized over a previously traced circuit and at contacts 804 prepares a circuit to relay 860.

In operating, relay 810 completes a previously traced circuit to relay 820 at contacts 811 and relay 820 in operating, completes a circuit to magnet 855 at contacts 821. In operating, magnet 855 completes a previously traced circuit to relay 860 at contacts 856 and at contacts 857 opens the circuit to relay 810. In operating, relay 860 completes a circuit to the code sounders 870 and 880 at contacts 861 and the second half of the code ringing is started as the code sounders make a first stroke.

In restoring relay 810 opens the circuit to relay 820 at contacts 811 and relay 820 in restoring, opens the circuit to magnet 855 at contacts 821. Magnet 855 in restoring, opens the circuit to relay 860 at contacts 856, at contacts 857 completes a circuit to the relay 810 and steps wipers 885, 886 and 887 to the ninth contacts.

In operating, relay 810 completes a circuit to relay 820 at contacts 811 and relay 820 in operating, completes a circuit to magnet 855 at contacts 821. In operating, magnet 855 completes a circuit to relay 860 at contacts 856 and at contacts 857 opens the circuit to relay 810. In operating, relay 860 completes a circuit to the code sounders 870 and 880 at contacts 861 and the code sounders then make a second stroke.

In restoring, relay 810 opens the circuit to relay 820 at contacts 811 and relay 820 in restoring, opens the circuit to magnet 855 at contacts 821. Magnet 855 in restoring, opens the circuit to relay 860 at contacts 856, at contacts 857 completes a circuit to the relay 810 and steps wipers 885, 886 and 887 to the tenth contacts.

In operating, relay 810 completes a circuit to relay 820 at contacts 811 and relay 820 in operating completes a circuit to magnet 855 at contacts 821. In operating, magnet 855 completes a circuit to relay 860 at contacts 856 and at contacts 857 opens the circuit to relay 810. In operating, relay 860 completes a circuit to the code sounders 870 and 880 at contacts 861 and the code sounders then make a third stroke.

In restoring, relay 810 opens the circuit to relay 820 at contacts 811 and relay 820 in restoring, opens the circuit to magnet 855 at contacts 821. Magnet 855 in restoring, opens the circuit to relay 860 at contacts 856, at contacts 857 completes a circuit to the relay 810 and steps wipers 885, 886 and 887 to the eleventh contacts.

As wiper 887 engages its eleventh contact relay 800 is shunted down in the following manner: from ground at contacts 736, wiper 795 and engaged third contact, conductor 778, eleventh contact and engaged wiper 887, contacts 842 and shunting out the battery of relay 800, therefore allowing relay 800 to release.

In releasing, relay 800 opens its own locking circuit at contacts 801, at contacts 802 the circuit to relay 810 is opened, at contacts 803 the circuit to relay 820 is completed as previously traced and at contacts 804 the circuit to relay 860 is opened. The wipers 885 to 887 are automatically stepped by the previously described interaction between relay 820 and magnet 855 until the first marked bank contact is again engaged by wiper 886.

The first ringing of the particular code call has just been completed, however, the inter-action between relays 800, 810, 820, 860 and motor magnet 855 will continue the code ringing until the paged party (executive at station A) answers the code call. The answering will now be described in the following paragraphs.

The executive, upon hearing the ringing of his code call may proceed to the nearest available telephone and answer the call by merely dialing the code call answering number which is the single digit "2." As the executive removes his receiver, it is assumed that the finder connector link illustrated in Figures 3 and 4 has been seized, the single digit "2" has been dialed and all the relays energized and operated as previously described in the section entitled "Regular P. A. X service" up to and including the dialing of the first digit "2." Upon completion of the dialing of the digit "2," it will be noted that motor magnet 490 (Figure 4) has rotated wipers 465, 466, 467, 468, and 469 into engagement with their respective second contacts and that wiper 468 has completed a circuit to the relay 380 over a path from ground at contacts 306, conductor 365, contacts 472, wiper 468 and engaged second contact, conductor 349 and through the winding of relay 380 to battery. In operating contacts 381 and 382, relay 380 completes a circuit through the lower winding of relay 480, this circuit extending from ground at contacts 382, conductor 377, contacts 455, 432, the lower winding of relay 480, contacts 486, 461, conductor 339, contacts 381, conductor 338, wiper 467 and engaged contact, conductor 673, cable C690, conductor 673 (Figure 6) and through the resistance to battery. In operating, relay 480 locks itself operated at "x" contacts 485, this circuit extending from ground at contacts 382, conductor 377, contacts 485 and through the upper winding of relay 480 to battery. At contacts 486 the first energizing circuit for relay 480 is opened, at contacts 484 a ground is applied to the control conductor for busying the system to others trying to answer the code call, at contacts 482 and 483 the connection of the executive with station C' is prepared and a circuit is prepared for the ring-cut-off relay 420 to operate in series with relay 600 (Figure 6), this circuit extending from ground at contacts 403, contacts 424, 483, wiper 466 and engaged second contact, conductor 672, cable C690, conductor 672, contacts 602, upper winding of relay 600, conductor 671, cable C690, conductor 671, second contact engaged with wiper 465, contacts 482, 421, 401 and through the lower winding of relay 420 to interrupted generator (INT. GEN).

In operating "x" contacts 426, relay 420 locks itself energized over a circuit extending from ground at contacts 484, conductor 338, contacts 381, conductor 339, contacts 426 and through the upper winding of relay 420 to battery. At contacts 421 and 424, the previously traced energizing circuit for relays 420 and 600 is opened, however, relay 600 has also locked operated in the manner described in the following paragraph. At contacts 422 and 425, relay 420 completes the extension of the talking conductors through the finder-connector link.

In operating, relay 600 locks itself energized at "x" contacts 603, this circuit extending from ground at contacts 713, conductor 658, contacts 603 and through the lower winding of relay 600 to battery. At contacts 601, relay 600 prepares to open the circuit to relays 720 and 730, at contacts 602 the first energizing circuit to relay 600 is opened, at contacts 604 the pulsing circuit is opened and at contacts 605 the extension of the talking conductors of the executive is completed with station C'.

If the above mentioned connection is made during the sending of a code, relays 720 and 730 will remain operated from the ground at closed off-normal springs 875 and the equipment will continue to send the unfinished code until the wipers have engaged the last or 26th contact, at which time the off-normal springs 875 open and the circuit to relays 720 and 730 is opened.

The talking connection between the executive and station C' may be traced from the station at which the executive answered the call, the finder-connector link (Figures 3 and 4), cable C690, through condensers C7 and C8 (Figure 6) to the wipers 613 and 614 which are resting on the contacts terminating the talking conductors of station C'. Talking battery is supplied to the executive from line relay 330 (Fig. 3) and to station C' from line relay 660 (Fig. 6).

In restoring, at contacts 721, relay 720 prepares the self interrupter circuit to motor magnet 760. Relay 730 in restoring opens the circuit to relay 820 and motor-magnet 855 at contacts 739 and at contacts 740 prepares the self interrupter circuit to motor magnet 765.

After completion of conversation the executive replaces his receiver and his associated seized finder-connector link is released in a manner similar to that described in the section entitled "Regular P. A. X service." The subscriber at station C' replaces his receiver and the code call equipment is released in the following manner: the circuit is opened to line relay 660 and it restores, thereby opening the circuit to relay 700 at contacts 661. Relay 700 in restoring, opens the circuit to relay 710 at contacts 701. Relay 710 in restoring, opens the circuits to relays 600 and 650 at contacts 713, at contacts 711 a circuit is completed to the right winding of relay 750, this circuit extending from multiple grounded contact and engaged wiper 786, contacts 711 and through the right winding of relay 750 to battery. At contacts 716 a similar circuit from multiple grounded contact and engaged wiper 796 to the left winding of relay 750 is completed. Relay 600 has restored and in restoring, relay 650 prepares a circuit to the alarm lamp 790 at contacts 653.

In operating, relay 750 completes circuits to motor magnets 760 and 765 at contacts 755 and 751 respectively, these circuits extending from multiple grounded contact and engaged wiper 786, contacts 711, 755, 721, 761 and through the winding of magnet 760 to battery and from multiple grounded contact and engaged wiper 796, contacts 716, 751, 740, 766 and through the winding of magnet 765 to battery respectively. An obvious circuit for the alarm lamp is completed at contacts 756.

In operating, magnets 760 and 765 deenergize and reenergize themselves and rotate their respective wipers 785, 786, 787 and 795, 796, and 797 until the wipers are again on the number one or home position and no ground is encountered by wipers 786 and 796, thereby releasing relay 750. Relay 750 in restoring, extinguishes the alarm lamp 790 at contacts 756 and the code call equipment is now completely restored and conditioned for future use.

*Special alarm*

The code call equipment is sometimes used for sending special alarms such as fire alarms or starting and dismissal signals. Usually the special alarms are of greater importance than regular code calls and hence should have right-of-way if it can be given without distorting a regular signal. Means have been provided for preventing such interference. The special alarm may be initiated by any equipment which will momentarily ground the special code alarm lead. The means, as illustrated in Fig. 8, for grounding the above-mentioned lead is a push button such as 865.

Assuming, for the present, that the code ringing machine is not in use when the special alarm is to be sounded, grounding of the special code alarm lead at push button 865 will cause the equipment to operate in the following manner: an obvious circuit is completed to relay 830. In operating contacts 831, relay 830 applies a ground potential to wiper 885, at contacts 832 relay 830 locks itself operated to ground at contacts 851. At contacts 833 a circuit is completed to relay 730, this circuit extending from ground at contacts 833, conductor 742 and the winding of relay 730 to battery and at contacts 834 a locking circuit is prepared to relay 840. The operation of relay 730 has been covered in the section entitled "Code call," but more specifically, relay 730 opens the control conductor at contacts 731 so that a regular code call can not be established, and at contacts 739 a previously traced circuit in the above mentioned section is completed to relay 820.

Relay 820 and motor magnet 855 interrupt each other, as previously described, to rotate wipers 885, 886 and 887 to their respective first contacts, at which time a circuit is completed to relay 840, this circuit extending from ground at contacts 831, wiper 885 and its engaged first contact and through the winding of relay 840 to battery. In operating contacts 841, relay 840 completes a circuit to relay 800, this circuit extending from ground at contacts 841, first contact and engaged wiper 886 and through the winding of relay 800 to battery. At contacts 842 the previously mentioned shunting circuit for relay 800 is opened and at contacts 843 relay 840 locks itself operated to ground from contacts 851. The operation of relay 800 has been covered in the section entitled "Code call" and also the interaction between relays 800, 810, 820, motor magnet 855 and relay 860 for causing the code sounders 870 and 880 to operate. A signal pulse is sent as wipers 885, 886 and 887 are moved off their respective first contacts and such pulses continue until the wipers are moved off their 24th contacts. In reaching the 25th contacts a circuit is completed to relay 850, this circuit extending from ground at contacts 831, wiper 885 and its engaged 25th contact and through the winding of relay 850 to battery. In operating, relay 850 opens the circuit to relays 830 and 840 at contacts 851 and at contacts 852 the circuit is opened to relays 800, 810 and 820, allowing them to restore. In releasing, relay 830 removes ground from wiper 885 at contacts 831 for releasing relay 850 and at contacts 833 the energizing circuit to relay 730 is opened. Relay 730, however remains operated from the ground at closed off-normal springs 875. In releasing, relay 840 removes ground from the first contact of wiper 886 at contact 841. In releasing, relay 850 again completes the energizing circuit for relay 820 which causes motor magnet 855 to rotate its wipers 885, 886, and 887 from the 25th contacts to their respective 26th contacts or "home" position, at which time off normal springs 875 open the circuit to relay 730. In releasing, relay 730 opens the circuit to relay 820 and magnet 855. The code call equipment and special alarm feature is again at rest.

If a regular code call is in progress and the regular code ringing is taking place when the special code alarm push button is depressed, relay 830 will operate and lock as before, but since wiper 885 has passed the first contact, relay 840 cannot operate for the present. Thus the regular code cycle is permitted to finish but the second cannot be started until the special alarm is sent, because the wiper 885 will engage contact one on its next revolution and operate relay 840 which then converts the equipment for the special alarm as wipers 886 and 887 are prevented from shunting relay 800 at contacts 842. The special code is sent as described in the previous paragraphs and as the 25th contact is reached the code call machine is released for continuance of the regular code call if desired.

*Key conference*

The following description concerns the special service feature "Key conference" in which a conference call may be established by one or a few stations, with such stations requiring a non-locking key such as 168 to be depressed.

Figures 1 and 2 will be used for the present description and the illustration of this special service shows station A′ as being the one who can initiate the conference call and stations B′ and C′ being the other members on the conference circuit with station A′, however, the key may be installed at stations not in the conference group.

In order to establish a key conference call, the following operations will occur: assuming that the subscriber at station A′ desires to initiate a conference call and talk to the subscribers at stations B′ and C′, key 168 is depressed. At this time it is to be remembered that the receiver can be removed either before or after the key is depressed, but that the receiver should be removed before the key is released. The depression of key 168 completes a circuit to the relay 245, this circuit extending from ground at key 168, conductor 199 and through the winding of relay 245 to battery.

In operating, relay 245 completes a circuit to the cut-through relay 100, this circuit extending from ground at contacts 246, contacts 202, conductor 109 and through the winding of relay 100 to battery. Similar circuits are completed for relays 110 and 120 extending from grounded contacts 247 and 248 respectively.

The ringer will not operate at station A′ because the receiver has been removed, therefore, ring cut-off relay 200 will operate over its lower winding as soon as relay 100 closes contacts 104 and 105, this circuit extending from ground at contacts 207, conductor 173, contacts 105, the closed loop of station A′, contacts 104, conductor 172, contacts 204, and the lower winding of relay 200 to battery-connected generator. At contacts 101 and 102, relay 100 removes station A from the line completely during the conference call, at contacts 103 and 106 the line containing station A and A′ is removed from all the finder-connector links, at contacts 107 ground is applied to the control conductor to busy that line to incoming calls and at contacts 108 the circuit is opened to the line and cut-off relay 130. Cut-through relays 110 and 120 function the same as cut-through relay 100 with the exception that as the receivers at stations B′ and C′ are not removed, the closing of the respective contacts 114, 115 and 124 and 125 prepare (instead of complete) circuits through the lower windings for the respective ring cut-off relays 210 and 220 and complete later-explained ringing current circuits.

In operating "X" contacts 203, ring cut-off relay 200 locks itself to ground at contacts 246 by way of its upper winding, at make-before-break contacts 201 and 202 a locking circuit is prepared for relay 100, at contacts 204 and 207 the previous energizing circuit for relay 200 is opened and the talking conductors of station A′ are further extended at contacts 205 and 206. A circuit is now completed for the battery feed relay 230, this circuit extending from ground through the lower winding of relay 230, contacts 206, talking conductor 173, contacts 105, closed loop of station A′, contacts 104, talking conductor 172, contacts 205 and through the upper winding of relay 230 to battery.

In operating, relay 230 completes the locking circuit for relay 100 from ground at contacts 231, at contacts 232 and 233 the talking conductors are extended further to the common conference talking conductors and at contacts 234 an obvious holding circuit is completed for relay 245.

As previously mentioned, the operation of relays 110 and 120 complete ringing circuits to stations B′ and C′ by way of contacts 114, 115 and 124 and 125 respectively. The ringing circuit for station B′ extending from interrupted generator and through the lower winding of ring cut-off relay 210, contacts 214, conductor 182, contacts 114, and through the ringer attached to the negative talking conductor at station B′ to ground. The ringing circuit for station C′ follows a corresponding path from the interrupted generator at relay 220 to the ringer of station C′.

After a normal ringing period, stations B′ and C′ remove their receivers, thereby shunting out their ringers and completing circuits to their ring cut-off relays 210 and 220 respectively. The circuit for relay 210 extending from ground at contacts 217, conductor 183, contacts 115, closed loop at station B′, contacts 114, conductor 182, contacts 214 and through the lower winding of relay 210 to battery at interrupted generator. The circuit for relay 220 follows a corresponding path from grounded contact 227 and through the lower winding of relay 220 to interrupted generator.

The operation of relays 210 and 220 is identical to the operation described for the ring cut-off relay 200. Relays 235 and 240 also operate in the same manner as the description covering relay 230, with the exception that the ground applied at contacts 239 and 244 is a multiple ground connection for maintaining relay 245 operated by any station once the conference call has been answered and that contacts 237, 238 and 242 and 243, as operated by their respective relays, complete the talking connections from each station for the conference circuit.

The battery feed relays 230, 235 and 240 supply stations A′, B′ and C′ with talking battery during conversation. It will be remembered that during the conference call, stations A, B and C are completely disconnected from their respective lines and cannot receive incoming calls or initiate outgoing calls.

After completion of conversation the conference call will be released and the equipment will be restored in the following manner: as station A′ replaces his receiver, the circuit is opened to relay 230, which upon restoring opens the locking circuit to relay 100 at contacts 231, at contacts 232 and 233 disconnects station A′'s talking conductors from the conference circuit and at contacts 234 removes one of the multiple ground connections from relay 245. In restoring, relay 100 prepares to connect station A with its line at contacts 101 and 102, at contacts 103 and 106 the talking conductors of stations A and A′ are connected to their regular line, and at contacts 107 the busy condition is removed from the line. Station B′ restores its equipment in the same manner as described for station A′ and station C′ also restores its equipment in a similar manner with the exception that, assuming station C′ (in this instance) is the last station to restore, as relay 240 restores contacts 244, the last holding ground is removed from relay 245 which then restores. At contacts 246, 247 and 248, relay 245 opens the holding circuits to relays 200, 210 and 220 respectively, which then restore and prepare the above-mentioned stations for future conference calls.

It will be noted that when the key 168 is depressed and if the receiver at station A′ should not be removed, station A′ would also ring himself and buzzer 169 will emit a continuous audible sound until one of the other stations in the conference group answers the call, at which time battery feed relays such as 235 and 240 shunt down buzzer 169 from ground at contacts 239 and 244, thus serving as a signal that at least one of the conference members has answered and station A′ may then remove his receiver. The signal due to stopping of the buzzer is now advantageous if the key and buzzer are installed at a station not in the conference groups, because the signal then is the only indication to the station initiating the call that at least one member of the groups has answered.

It will also be noted that the above-mentioned type of conference may be included in the exchange which also provides regular local-to-local service and code calls.

*Multi-group conference*

Figure 2A:
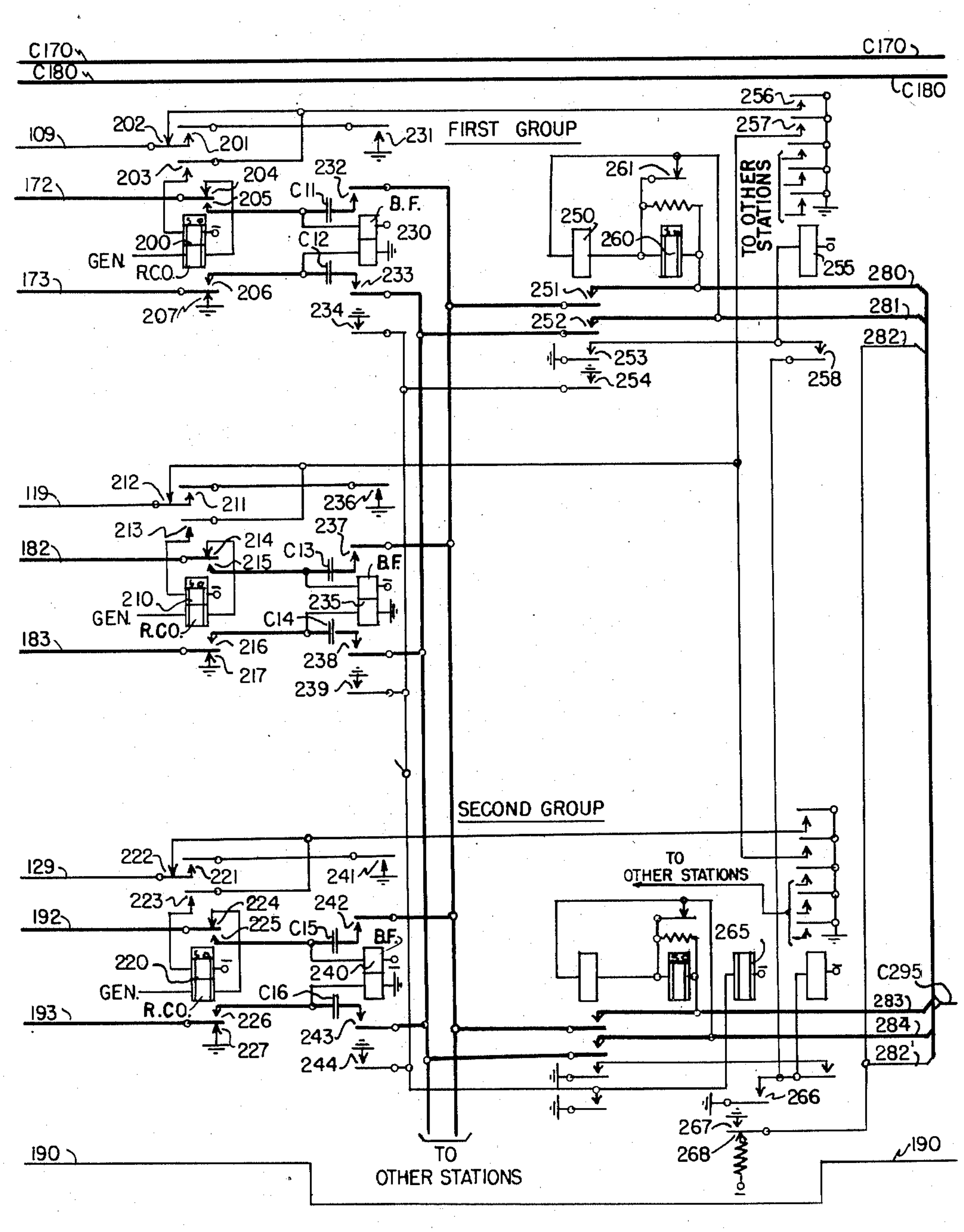
Figure 2B:
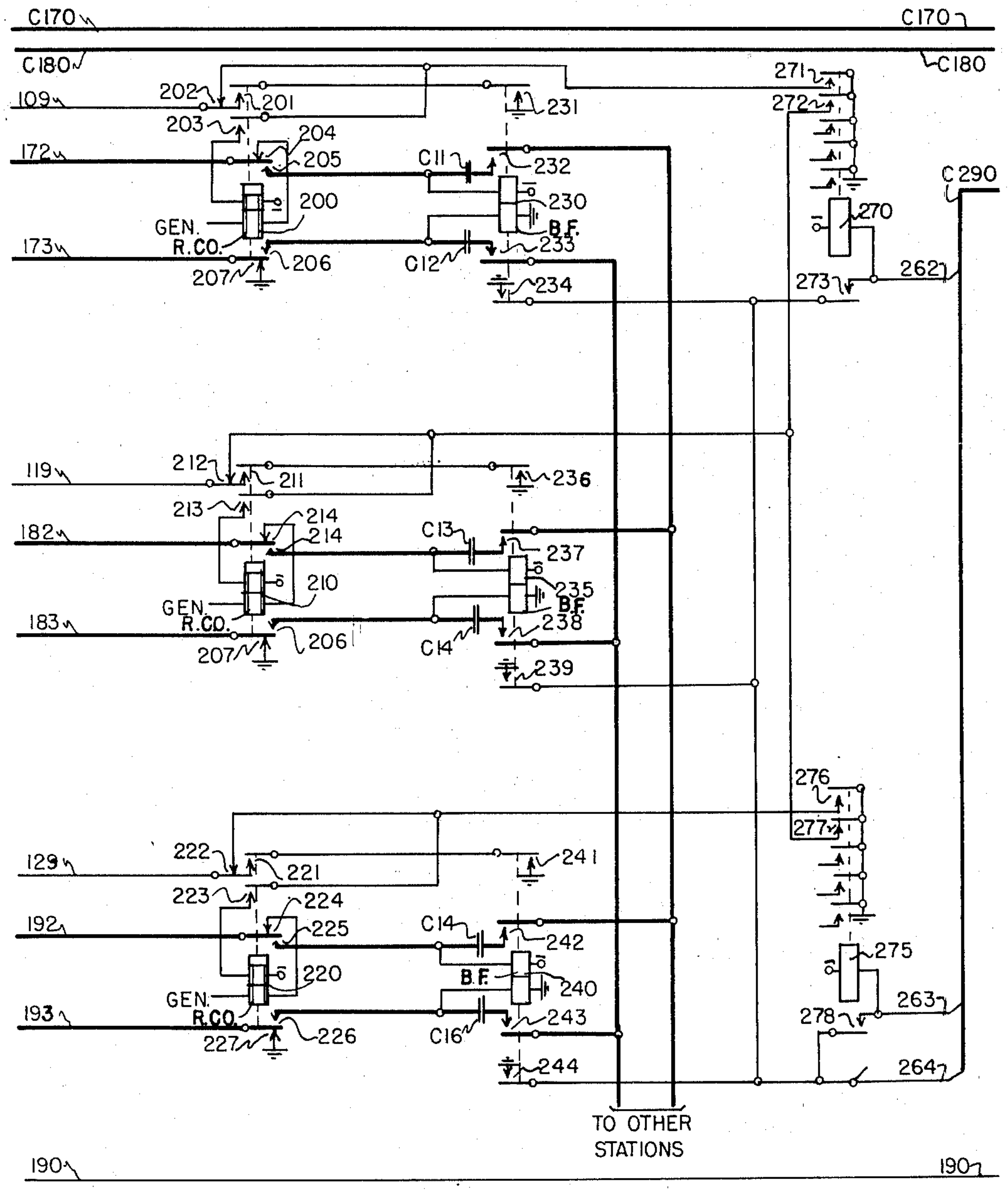

The following special service feature illustrates conference call equipment providing multi-conference groups and is shown in Figures 2B, 9 and 10. The description covering this type of conference can best be understood by referring to the figure-number diagram of Figure 15 in which Figures 1, 2B, 3, 4, 5, 9 and 10 are so arranged as to best illustrate the description.

Figure 10 is shown as wired for five conference groups, however, it is possible to wire for ten groups. Figure 2B illustrates groups 1 and 2, each having a minimum of two stations, with station B′ being common to both groups. It will be remembered that only the stations assigned to the conference groups can initiate a conference call of this type. For this description, it will be assumed that the five-group conference is provided and that the groups 1 through 5 have been assigned the single digit group call numbers of "1" through "5" respectively. In order to initiate a conference call, any station assigned to a group must prefix the single digit "1" to the group call number of the conference group desired. The digit "1" should be dialed, then a slight pause to wait for a second dial tone before dialing the group call number.

Assuming that station B′ (common to groups 1 and 2) desires to initiate a conference call over group 2, the equipment will operate as follows: as station B′ removes the receiver, his line is found by a finder-connector link and upon receipt of dial tone, the preliminary single digit "1" is dialed. The operation of the seized link is the same as that described in the section entitled "Regular P. A. X service" up to and including receipt of the last pulse of the digit "1," at which time wipers 465 through 469 are engaged with the first contact on each of their respective banks and circuits are completed to relays 360 and 380. The circuit to relay 360 extending from ground at contacts 306, conductor 365, contacts 472, wiper 469 and engaged first contact, conductor 369 and through the winding of relay 360 to battery and the circuit to relay 380 extending from ground at contacts 306, conductor 365, contacts 472, wiper 468 and engaged first contact, conductor 349 and through the winding of relay 380 to battery. Relays 360 and 380 operate simultaneously and at contacts 362 and 383 a ground potential from relay 370 is applied to the contact terminating the extra control conductor 363 accessible to wiper 938 of Figure 9 and at contacts 381 and 382 a series-parallel circuit is completed for relays 480, 920 and 930. The circuit for relays 480, 920 and 930 may be traced as follows: from ground at contacts 382, conductor 377, contacts 455, 432, lower winding of relay 480, contacts 486, 461, conductor 339, contacts 381, conductor 338, wiper 467 and engaged first contact, conductor 1064, contacts 1037, 1007, 1013, conductor 986 and through each winding of relays 920 and 930 to battery. In operating contacts 921, relay 920 prepares a circuit for relay 940, at contacts 922 a circuit is completed for relay 900 and for preenergizing the upper winding of relay 910 by way of resistance R15. The circuit for relay 900 extending from ground at contacts 922, contacts 911, 966 and through the winding of relay 900 to battery. At contacts 923 relay 920 prepares an energizing circuit through the lower winding of relay 910.

In operating contacts 901, relay 900 completes an obvious circuit to motor magnet 965. Magnet 965 in operating contacts 966 opens the circuit to relay 900, which upon restoring opens the circuit to magnet 965 at contacts 901. Magnet 965, upon restoring advances its wipers 935 through 938 from their "home" position (26th contact) to their respective first contacts of each bank and at contacts 966 completes the circuit to relay 900. In operating contacts 901, relay 900 completes the circuit to magnet 965 which upon operating opens the circuit to relay 900 at contacts 966. Relay 900 in restoring contacts 901 opens the circuit to magnet 965. Magnet 965 in restoring, advances its wipers 935 through 938 a second step and at contacts 966 against completes the circuit to relay 900. This interaction between relay 900 and magnet 965 continues until the last release of magnet 965 rotates wiper 938 to engage the contact terminating conductor 363, at which time a circuit is completed for the preenergized relay 910 in series with relay 370, this circuit extending from ground at relay 370 and through its winding, conductor 346, contacts 434, conductor 345, contacts 362, 383, wiper 329 and engaged contact, conductor 363, cable C311, conductor 363, the contact engaged by wiper 938, lower winding of relay 910 and contacts 923 to battery.

Relay 910 operates before relay 900 has had time to reoperate and opens the circuit to relay 900 at contacts 911, at contacts 912 the resistance R—15 is shunted to complete an obvious locking circuit for relay 910 by way of its upper winding and at contacts 913 a ground is applied to the control conductors of station B′ to maintain the line and cut-off relay 140 operated and to busy station B′ to incoming calls.

In operating contacts 371, relay 370 initiates the release of the associated seized finder connector link by releasing relay 300. The equipment is restored in the same manner as described in the section entitled "Code call."

Referring now to the conference equipment in Figures 9 and 10, the energizing circuit of relay 910 has been opened but relay 910 remains operated over its forementioned locking circuit and the circuit to relays 920 and 930 is opened when the finder-connector link is released. Relay 930 restores ahead of the slow-to-release relay 920 and at contacts 931 an obvious circuit is completed to relay 940, which in operating contacts 941 and 942 extends the talking conductors of station B' to line relay 950 causing relay 950 to operate in the usual manner. At contacts 943 dial tone is transmitted out over the calling line and at contacts 944 an alarm circuit is maintained open. In operating contacts 951, line relay 950 completes an obvious circuit to the hold relay 960. In operating contacts 961, relay 960 completes an obvious circuit to relay 1000 and at contacts 962 the pulsing circuit from relay 950 is prepared.

In operating contacts 1001, relay 1000 prepares a circuit for relay 1020, at contacts 1002 a holding circuit for relay 940 is completed, at contacts 1003 the pulsing circuit for motor magnet 1040 is prepared, at contacts 1004 a maintaining ground is applied to the control conductor of station B' preparing for the future release of relay 910, at contacts 1005 the self-interrupter circuit of motor magnet 1040 is opened, at contacts 1006 ground is applied to the control conductor 1064 for busying the conference equipment during the present call and at contacts 1007 the circuit to relays 920 and 930 is further opened. At this point, relay 920 completes restoring and at contacts 922 the locking circuit of relay 910 is opened and relay 910 restores.

Upon receipt of dial tone from the conference equipment (actually the second dial tone), the subscriber at B' dials the conference group call number of the group he desires (in this case it will be the call number "2" of the second group).

The digit "2" of the group call number is dialed and line relay 950 responds to the two dial pulses in a well-known manner. At the beginning of the first pulse, relay 950 restores and at contacts 951 opens the circuit to relay 960, which being slow-to-release remains operated during dialing. At contacts 952 circuits are completed to relay 1030 and magnet 1040. The circuit for relay 1030 extending from ground at contacts 952, contacts 962, conductor 984, contacts 1024 and through the winding of relay 1030 to battery, relay 1030 being slow-to-release remains operated only during pulsing. The circuit for magnet 1040 extends from ground at contacts 952, contacts 962, conductor 984, contacts 1003, 1025 and through the winding of magnet 1040 to battery. In operating contacts 1031, relay 1030 maintains an open circuit to relay 1020 during pulsing. Magnet 1040 operates and prepares to step the wipers 1045, 1046 and 1047 from one of the "home" contacts (25th as illustrated) to the next contact which corresponds to group one of the conference groups. At the end of the first pulse, relay 950 reenergizes and at contacts 952 opens the circuit to relay 1030 and magnet 1040. Relay 1030, however, remains energized and as magnet 1040 restores, wipers 1045, 1046 and 1047 are advanced one step. As all but the 6th, 12th, 18th and 25th contacts of the bank for wiper 1046 are grounded, an obvious circuit is completed to relay 1010 by way of said wiper and engaged first contact. In operating, relay 1010 prepares an alarm circuit to the lamp 1050, at contacts 1011 and at contacts 1012 a busying ground is prepared for busying the conference call equipment until motor magnet 1040 has rotated its wipers to one of the "home" positions.

At the beginning of the second pulse, relay 950 restores and at contacts 952 completes the aforementioned circuits to relay 1030 and magnet 1040. Relay 1030 however, remains operated from its previous energization and magnet 1040, in operating, prepares for advancing its respective wipers a second step. At the end of the second pulse, relay 950 reenergizes and at contacts 952 opens the circuits to relay 1030 and magnet 1040. Magnet 1040 in restoring advances wipers 1045, 1046 and 1047 a second step and in restoring, relay 1030 after an interval completes a circuit to relay 1020 at contacts 1031, this circuit extending from ground at contacts 1001, contacts 1031, wiper 1045 and engaged second contact, the multiple connections of the contact bank, contacts 1022 and through the winding of relay 1020 to battery.

In operating contacts 1021, relay 1020 completes its own locking circuit in an obvious manner, at contacts 1023 dial tone is removed from the calling line, at contacts 1024 the previous energizing circuit to relay 1030 is opened, at contacts 1025 the pulsing circuit to magnet 1040 is opened, at contacts 1026 the "homing" circuit for magnet 1040 is opened and at contacts 1027 a circuit is completed to the selecting relay 275 in the second group conference. The circuit to relay 275 extending from ground at contacts 1027, wiper 1047 and engaged second contact, conductor 263, cable C290, conductor 263 and through the winding of relay 275 to battery.

In operating contacts 276 and 277, relay 275 completes circuits to the cut-through relays 110 and 120 over a path previously described in the section entitled "Key conference" and at contacts 278, relay 275 prepares its own locking circuit.

The operations of cut-through relays 110 and 120, ring cut-off relays 210 and 220 and battery feed relays 235 and 240 is the same as that described in the above-mentioned section and is believed unnecessary to repeat the description. However, as cut-through relay 110 opens contacts 113 and 116, the talking conductors from station B' are disconnected from the group conference equipment of Figures 9 and 10, thus releasing line relay 950, and as battery feed relays 235 and 240 operate their grounded contacts 239 and 244, an obvious holding circuit is completed for relay 275 and a circuit is completed for relay 1035 (Fig. 10) to prevent the conference equipment from reoperating during the present conference. The circuit for relay 1035 extending from ground at contacts 239 and 244, conductor 264, cable C290, conductor 264 and through the winding of relay 1035 to battery.

Relay 1035, in operating contacts 1036, opens the control conductor to the conference equipment and at contacts 1037 a ground is applied to the control conductor 1064 to the connector links for busying the group conference circuits.

In restoring, relay 950 opens contacts 951 to release relay 960 which upon restoring opens contacts 961 to release relay 1000. As relay 1000 restores, it opens the circuits to relays 1020 and 940 at contacts 1001 and 1002 respectively. In restoring, relay 940 completes the circuit to the alarm lamp 1050 at contacts 944 and relay 1020 in restoring contacts 1026 completes the self-interrupter circuit of magnet 1040, this circuit extending from multiple grounded bank contacts, wiper 1046, contacts 1026, 1005, 1041 and the winding of magnet 1040 to battery. Magnet 1040 energizes and interrupts itself and advances wipers 1045, 1046 and 1047 one step after each deenergization, until the wipers have been stepped to the next "home" position (in this case—the 6th), thereby opening the circuit to magnet 1040 and relay 1010. At contacts 1011, relay 1010 opens the circuit to the alarm lamp 1050 and at contacts 1013 prepares for future calls over the control conductor.

After the conversation is completed, the cut-through, ring cut-off and battery feed relays are restored in the manner as described in the section entitled "Key conference," however the last battery feed relay to restore, at grounded contacts such as 239 or 244 opens the locking circuit to relay 275 and opens the operating circuit to relay 1035. In restoring at contacts 1036 and 1037 relay 1035 again completes the control conductor connection to the conference equipment and removes the busying ground sent to the connector links.

The equipment is now at rest and conditioned to handle future calls.

*Two-group conference*

The following special service feature illustrates conference call equipment providing two conference groups. The description covering this type of conference can best be understood by referring to the figure-number diagram of Figure 14 in which Figures 1, 2A, 3, 4 and 5 are so arranged as to best illustrate the description. It is to be noted that relays 360 and 370 (Fig. 3) are necessary only when code call or multi-group conference is provided, therefore, during the present explanation it will be assumed that conductor 369 of relay 360 has been disconnected at the first contact of the contact bank individual to wiper 469.

The first and second contact terminals of each connector contact bank are assigned to their respective first and second conference groups and the single digits "1" and "2" have been assigned as the initiating call number for group numbers one and two respectively.

Figure 2A shows a first and second conference group having a minimum of stations in each group. The first group containing stations A' and B' and the second group containing stations B' and C', with station B' being common to each group.

A conference call over only one group will be explained in detail in the following paragraphs with references being made to the description in the previous sections entitled "Regular P. A. X service" and "Key conference."

Assuming that station A' desires to initiate a conference call over the first group, the following operations take place: As the receiver is removed at station A' the distributor and seized linefinder operate in the manner as described in the above-mentioned sections. After hearing the customary dial tone the digit "1" is dialed and the seized finder-connector link operates in the same manner as described in the above-mentioned sections.

After the digit "1" has been dialed, wipers 465, 466, 467, 468 and 469 are engaged with the first contacts of their respective banks and relay 380 has been energized over a circuit extending from ground at contacts 306, conductor 365, contacts 472, wiper 468 and engaged first contact, conductor 349 and through the winding of relay 380 to battery. In operating contacts 382, relay 380 completes a circuit for the relay 480 through its lower winding, this circuit extending from ground at contacts 382, conductor 377, contacts 455, 432, the lower winding or relay 480, contacts 486, 461, conductor 339, contacts 381, conductor 338, wiper 467 and engaged first contact, conductor 282, cable C295, conductor 282 and through contacts 268 to battery.

In operating, at "X" contacts 485, relay 480 completes a previously described locking circuit for itself, at contacts 484 a ground is applied to the connector for busying the link to incoming calls and at contacts 482 and 483 a circuit is completed for the ring cut-off relay 420 by way of relay 260 (Fig. 2A) and its shunt, this circuit extending from ground at contacts 403, contacts 424, 483, wiper 466 and its engaged first contact, conductor 281, cable C295, conductor 281, contacts 261, relay 260 and its shunt, conductor 280, cable C295, conductor 280, the first contact engaged with wiper 465, contacts 482, 421, 401 and through the lower winding of relay 420 to battery at interrupted generator. Relay 260 is made slow to operate and is shunted by its resistance so that it will be delayed in operating from ringing current.

In operating "X" contacts 426, relay 420 locks operated to ground at contacts 484, and at contacts 422 and 425, connects the back bridge relay 410 to the connector talking conductors. Relay 260 now operates and at contacts 261 completes a circuit to the relay 250. The operating circuit for relay 260 may be traced as follows: from ground through the lower winding of relay 410, contacts 425, 483, wiper 466 and engaged first contact, conductor 281, cable C295, conductor 281, contacts 261, winding of relay 260, conductor 280, cable C295, conductor 280, the first contact engaged with wiper 465, contacts 482, 422 and through the upper winding of relay 410 to battery. As the relay 260 opens contacts 261, its former traced energizing circuit is now extended through the winding of relay 250 to complete the circuit to relay 250.

In operating, relay 250 completes a circuit from ground at contacts 254 to relay 265, at contacts 253 an obvious circuit is completed to relay 255 and at contacts 251 and 252 extends the talking conductors from the seized finder-connector link to the talking conductors common to the conference. In operating contacts 266, relay 265 prepares a locking circuit for relay 255 and at contacts 267 applies a ground potential to the control conductors, from the two conference groups, connected to the first and second contacts of each connector link to busy the equipment to any party desiring to initiate a conference call on either group while the present conference call is in progress.

Relay 255 in operating contacts 256 and 257 completes simultaneous circuits to cut-through relays 100 and 110 over paths traced in the section entitled "Key conference" and at contacts 258, relay 255 completes an obvious holding circuit for itself.

The operations of cut-through relays 100 and 110, ring cut-off relays 200 and 210 and battery feed relays has been described in the above-mentioned section and therefore believed unnecessary to repeat the description.

Remembering now that station A' has initiated the conference call and the illustrated finder-connector link (Figures 3 and 4) is in use, as cut-through relay 100 opens contacts 103 and 106 the line rely 330 (Figure 3) is released and the seized finder-connector link would release in the manner as described in the section entitled "Regular P. A. X. service." However, assuming for instance that a station containing no conference relays such as either station D or D' had established the conference call, his associated seized finder-connector link would remain operated and the talking connection to the common conference talking conductors would be through contacts such as 251 and 252 of a relay such as 250. It is assumed now that station B' has answered the call in the usual manner and that conversation is in progress.

After conversation is completed, both stations A' and B' replace their receivers and the equipment is restored as described in the section entitled "Key conference" with the exception that the last station to release its respective battery feed relay such as 230 or 235 removes the last multiple ground connection to relay 265, thereby allowing it to restore. Relay 265 opens the circuit to relay 255 at contacts 266 and relay 255 restores. At contacts 267, relay 265 removes the busy condition from both conference groups and the equipment is at normal and ready for future calls.

The initiation of a conference call over the second group covers similar operations, with the exception that the conference is established by dialing the single digit "2."

While what is now considered to be the preferred forms of the invention as has been illustrated, it is to be understood that numerous modifications may be incorporated therein without departing from the true spirit and scope of the invention. What is considered new and is desired to have protected by Letters Patent will be pointed out in the following claims.

What is claimed is:

1. In a telephone system, a plurality of subscriber lines, a plurality of stations on certain of said lines, each said station having an individual call number comprising only two digits, a rotary switch having a bank for terminating all said lines, said bank having a capacity less than the number of call numbers assigned for calling said stations, means responsive to the initiation of a call by one of said stations for automatically connecting said calling station to said rotary switch, and means including a motor magnet operated responsive to the calling station dialing said two-digit call number of any desired station for operating said rotary switch in two directive movements to connect with the line of said called station through said bank and for thereafter automatically selectively signalling the called station on such line.

2. In a telephone system as claimed in claim 1, including a two-digit code call number individual to each of certain ones of said stations, and, code call equipment connected to said rotary switch bank and accessible from said bank in response to a single directive movement of said rotary switch for subsequently code ringing a particular one of said stations in response to the dialing of said certain station's corresponding individual two-digit code call number.

3. In a telephone system, a plurality of subscriber lines, a plurality of stations on certain of said lines, each said station having an individual call number comprising only two digits, an automatic switch terminating all said lines and having a line capacity less than the number of call numbers assigned for calling said stations, wipers in said switch, means responsive to the initiation of a call by one of said stations for automatically connecting said calling station to said switch, means including a motor magnet operated responsive to the impulses representing the first digit of a two-digit call number for directively operating said wipers of said switch a step for each impulse and for selecting certain of said stations which may be signalled, and means including said motor magnet reoperated responsive to the impulses representing the second digit of the two-digit call number for directively operating said wipers of said switch a step for each impulse into association with the line of said called station and for thereafter automatically selectively signalling the called station.

4. In a telephone system, a plurality of subscriber lines arranged in groups, a plurality of stations on certain of said lines, each said station having an individual call number comprising only two digits, an automatic switch terminating all said lines and having a line capacity less than the number of call numbers assigned to said stations, wipers in said switch, means responsive to the initiation of a call by one of said stations for automatically connecting said calling station to said switch, means including a motor magnet operated responsive to the impulses representing the first digit of a two-digit call number for directively operating the wipers of said switch a step for each impulse, to determine the group of lines being called and to determine which stations of said lines of said determined group may be signalled, and means including said motor magnet reoperated responsive to the impulses representing the second digit of the two-digit call number for directively operating the wipers of said switch a step for each impulse into association with the line of said called station and for thereafter automatically selectively signalling said called station.

5. In a telephone system as claimed in claim 4, including circuit means completed for said motor magnet after said first directive movement of said switch wipers for automatically advancing the wipers of said switch to a terminal of said switch included in the corresponding group of lines such as determined by said first digit.

6. In an automatic switch including a test wiper, a first control wiper, a second control wiper and bank contacts accessible to said wipers, a normally open test circuit including said test wiper and the bank contacts accessible thereto, a first normally open automatic stepping circuit including said second control wiper and a pair of multipled bank contacts accessible thereto, a second automatic stepping circuit including said second control wiper and a plurality of multipled bank contacts accessible thereto for advancing said wipers in a stepping movement, means for directively operating said wipers to engage predetermined different ones of said bank contacts, said second automatic stepping circuit completed by said second control wiper in case said second control wiper is directively operated to engage one of said plurality of multipled bank contacts, a first relay operated over a circuit including said first control wiper in case said wipers are directively operated to engage bank contacts corresponding to either one of said pair of multipled bank contacts, contacts operated by said first relay for completing said first normally open automatic stepping circuit to advance said wipers in a stepping movement, a second relay operated over a circuit including said first control wiper and other bank contacts accessible thereto in response to said wipers being operated to engage said other bank contacts, and contacts on said second relay for closing said test circuit and for opening both said first and second automatic stepping circuits.

7. In an automatic switch including a test wiper, a first control wiper and a second control wiper, a normally open test circuit including said test wiper, a first normally open automatic stepping circuit including said second control wiper for automatically advancing said wipers in a stepping movement, a second automatic stepping circuit including said second control wiper for automatically advancing said wipers in a stepping movement, means for directively operating said wipers step-by-step to different positions, said second automatic stepping circuit completed by said second control wiper in case said wipers are directively operated to a particular one of said positions, means operative over a circuit including said first control wiper for completing said first automatic stepping circuit in case said wipers are directively operated to another one of said positions, and means operative over another circuit including said first control wiper for closing said test circuit and for opening said first and second automatic stepping circuits in response to said wipers being operated to a different one of said positions.

8. In a telephone system, subscriber lines, call numbers assigned to certain ones of said subscriber lines, a sender, a calling subscriber, means responsive to said calling subscriber dialing said call number assigned to a desired one of said certain subscribers for operating said sender to ring said desired subscriber in successive cycles of operations, means for operating said sender to transmit a special intermittent rin; and means for preventing said last means from operating said sender until after completion of one of said cycles of operations in case said sender is in use at the time said last means is operated.

9. In a telephone system, a plurality of subscriber lines, a plurality of stations on certain of said lines, each said station having an individual call number comprising only two digits, a rotary switch having a bank for terminating all said lines, said bank having a capacity less than the number of call numbers assigned for calling said stations, a motor magnet for operating said rotary switch, means responsive to the initiation of a call by one of said stations for automatically connecting said calling station to said rotary switch, circuit means controlled responsive to said calling station dialing the first digit of one of said two-digit call numbers for operating said motor magnet to operate said rotary switch in a first directive movement to select certain of said stations which may be signalled, other circuit means controlled responsive to said first movement of said switch for reoperating said motor magnet to automatically operate said rotary switch in a second directive movement such as determined by said first digit, and last circuit means controlled responsive to said calling station dialing the second digit of said two-digit call number for again reoperating said motor magnet to operate said rotary switch in a third directive movement to connect said calling station with the line of said called station through said bank and for thereafter automatically selectively signalling the called station on such line.

CLARENCE E. LOMAX.

REFERENCES CITED

The following references are of record in the file of this patent:

UNITED STATES PATENTS

| Number | Name | Date |
|---|---|---|
| Re. 17,006 | Nelson | June 19, 1928 |
| 1,594,610 | Gardner | Aug. 3, 1926 |
| 1,640,157 | Richardson | Aug. 23, 1927 |
| 1,685,547 | Lomax | Sept. 25, 1928 |
| 1,877,883 | Kahn | Sept. 20, 1932 |
| 1,950,437 | Eaton | Apr. 24, 1934 |
| 2,239,825 | Lomax | Apr. 29, 1941 |
| 2,303,015 | Beaumont | Nov. 24, 1942 |
| 2,386,126 | Lomax | Oct. 2, 1945 |